(12) United States Patent
Okamura et al.

(10) Patent No.: US 10,408,269 B2
(45) Date of Patent: Sep. 10, 2019

(54) WIRELESS SENSOR-EQUIPPED BEARING

(71) Applicant: NSK Ltd., Shinagawa-ku, Tokyo (JP)

(72) Inventors: Toshihiko Okamura, Fujisawa (JP); Kunihiko Sasao, Fujisawa (JP); Hideki Kobayashi, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 16/073,896

(22) PCT Filed: Mar. 31, 2017

(86) PCT No.: PCT/JP2017/013777
§ 371 (c)(1),
(2) Date: Jul. 30, 2018

(87) PCT Pub. No.: WO2017/171067
PCT Pub. Date: Oct. 5, 2017

(65) Prior Publication Data
US 2019/0040912 A1    Feb. 7, 2019

(30) Foreign Application Priority Data

Apr. 1, 2016   (JP) .................................. 2016-074109
Apr. 1, 2016   (JP) .................................. 2016-074110
Jul. 12, 2016  (JP) .................................. 2016-137697

(51) Int. Cl.
*F16C 41/00*    (2006.01)
*F16C 19/06*    (2006.01)
(Continued)

(52) U.S. Cl.
CPC ............. *F16C 41/00* (2013.01); *F16C 19/06* (2013.01); *F16C 19/52* (2013.01); *F16C 33/416* (2013.01);
(Continued)

(58) Field of Classification Search
CPC ..................... F16C 41/007; F16C 2233/00
See application file for complete search history.

(56) References Cited

U.S. PATENT DOCUMENTS 4,161,877 A * 7/1979 Bauer ................. F16C 19/522
73/593
9,989,097 B2 * 6/2018 Hebrard .............. F16C 41/002
(Continued)

FOREIGN PATENT DOCUMENTS

DE    10 2007 042 478 A1    8/2008
EP       1 203 960 A2         5/2002
(Continued)

OTHER PUBLICATIONS

International Search Report (PCT/ISA/210) issued in PCT Application No. PCT/JP2017/013777 dated Jul. 4, 2017 with English translation (four pages).
(Continued)

*Primary Examiner* — Thomas R Hannon
(74) *Attorney, Agent, or Firm* — Crowell & Moring LLP

(57) ABSTRACT

There is provided a wireless sensor-equipped bearing. A plurality of magnets are fixed between pockets of a retainer formed of an annular body such that an N pole and an S pole of the magnets neighbor in a circumferential direction of the annular body. A coil, a circuit unit and an antenna are fixed to a surface of a first seal, the surface being opposed to the magnets. A sensor is disposed on any one of an inner ring, an outer ring and the first seal.

8 Claims, 16 Drawing Sheets

(51) Int. Cl.
   *F16C 33/78*   (2006.01)
   *F16C 19/52*   (2006.01)
   *F16C 33/41*   (2006.01)

(52) U.S. Cl.
   CPC .......... *F16C 33/78* (2013.01); *F16C 33/7816* (2013.01); *F16C 41/004* (2013.01); *F16C 41/008* (2013.01); *F16C 33/7853* (2013.01); *F16C 41/007* (2013.01); *F16C 2233/00* (2013.01); *F16C 2361/00* (2013.01)

(56) References Cited

U.S. PATENT DOCUMENTS

| | | | |
|---|---|---|---|
| 2002/0054719 A1 | 5/2002 | Takizawa et al. | |
| 2005/0259903 A1 | 11/2005 | Takizawa et al. | |
| 2007/0014498 A1 | 1/2007 | Aoki et al. | |
| 2010/0172605 A1 | 7/2010 | Pausch et al. | |
| 2015/0355075 A1* | 12/2015 | Murray | G01M 13/045 384/448 |
| 2018/0149205 A1* | 5/2018 | Den Haak | H02K 7/1807 |
| 2018/0231059 A1* | 8/2018 | Kiyonaga | F16C 19/361 |

FOREIGN PATENT DOCUMENTS

| | | |
|---|---|---|
| JP | 3-80120 U | 8/1991 |
| JP | 11-326353 A | 11/1999 |
| JP | 2003-97582 A | 4/2003 |
| JP | 2004-353735 A | 12/2004 |
| JP | 2005-344842 A | 12/2005 |
| JP | 2006-90501 A | 4/2006 |
| JP | 2006-170624 A | 6/2006 |
| JP | 2012-149716 A | 8/2012 |
| JP | 2013-7672 A | 1/2013 |
| JP | 2015-59620 A | 3/2015 |

OTHER PUBLICATIONS

Japanese-language Written Opinion (PCT/ISA/237) issued in PCT Application No. PCT/JP2017/013777 dated Jul. 4, 2017 (four pages).
International Preliminary Report on Patentability (PCT/IB/338 & PCT/IB/373) issued in PCT Application No. PCT/JP2017/013777 dated Oct. 11, 2018, including English translation of document C2 (Japanese-language Written Opinion (PCT/ISA/237)) previously filed on Jul. 30, 2018 (seven pages).
European Search Report issued in counterpart European Application No. 17775598.0 dated Jan. 30, 2019 (five pages).
European Office Action issued in counterpart European Application No. 17 775 598.0 dated Feb. 13, 2019 (seven pages).

* cited by examiner

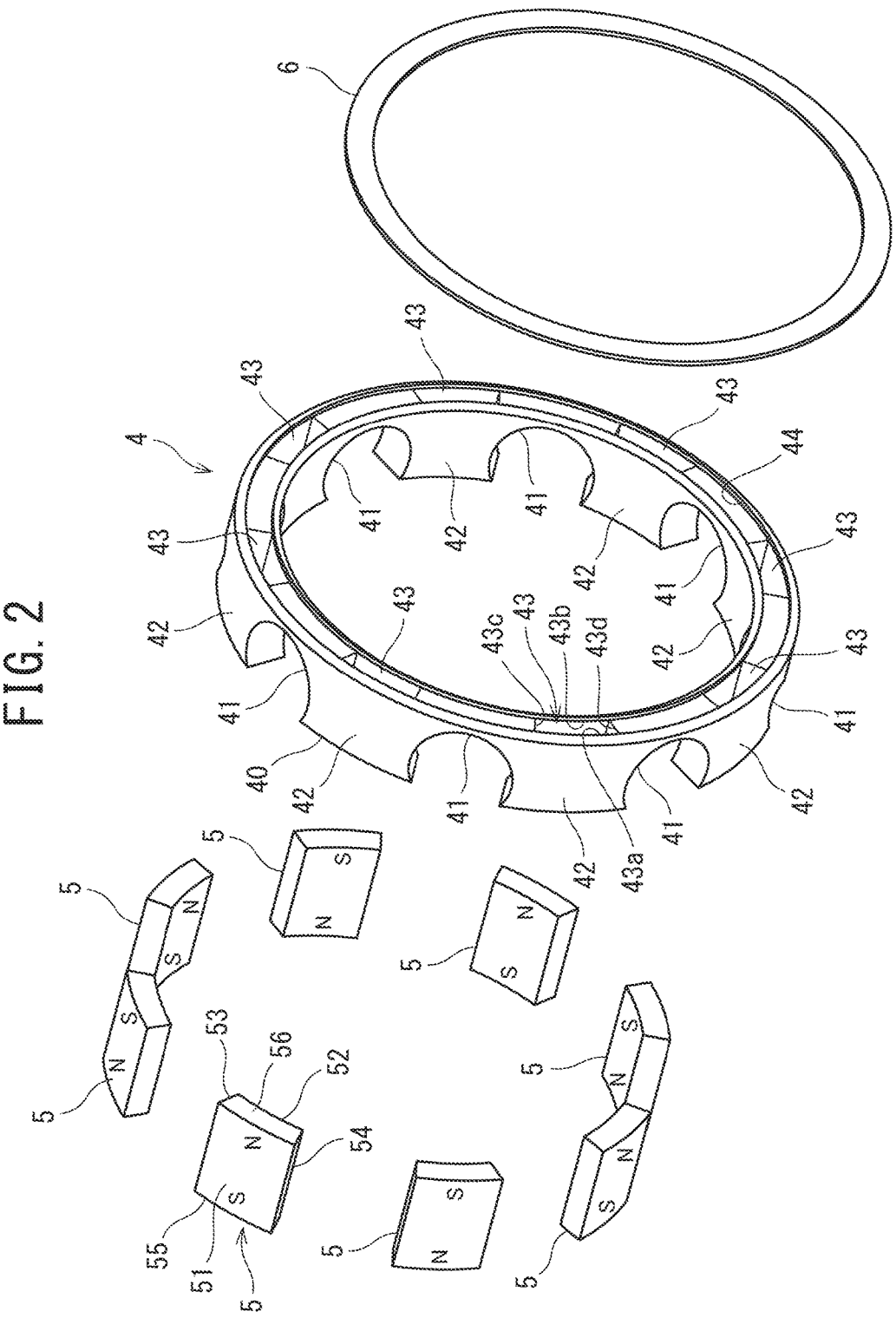

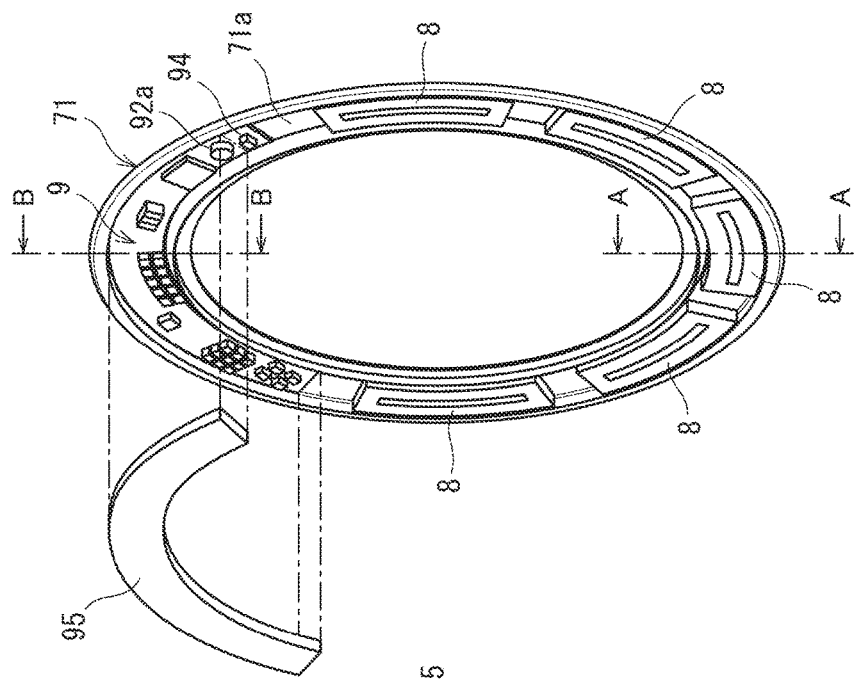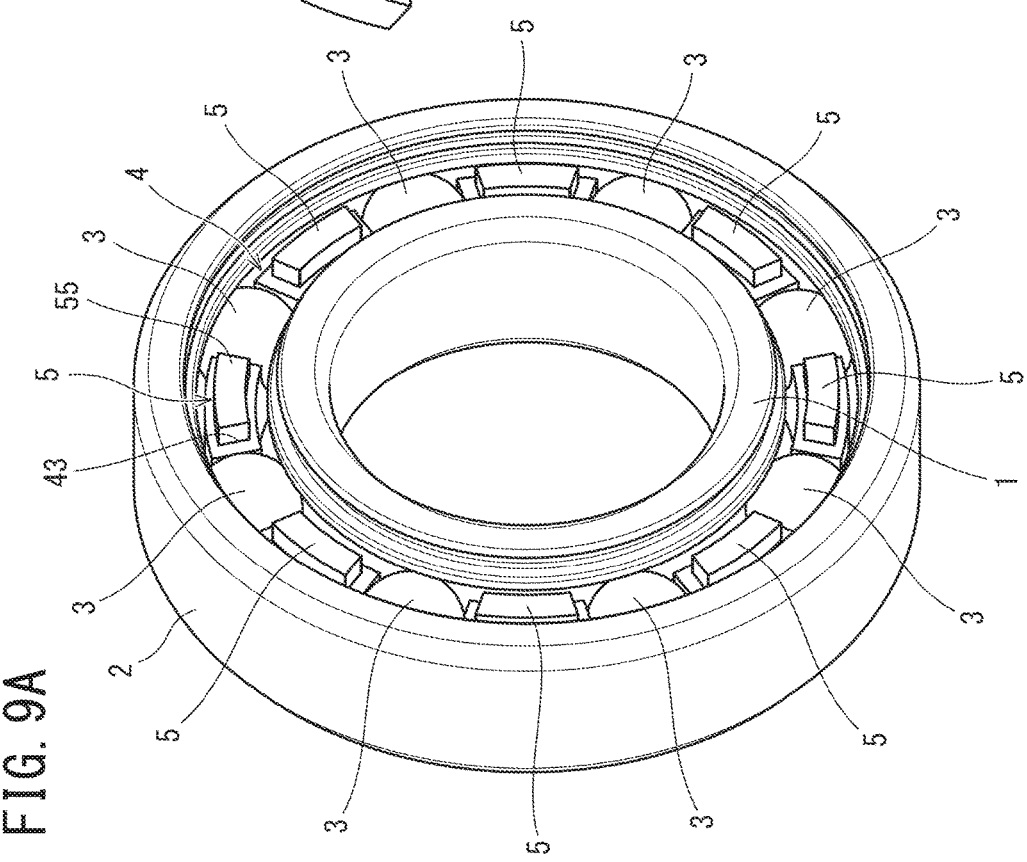

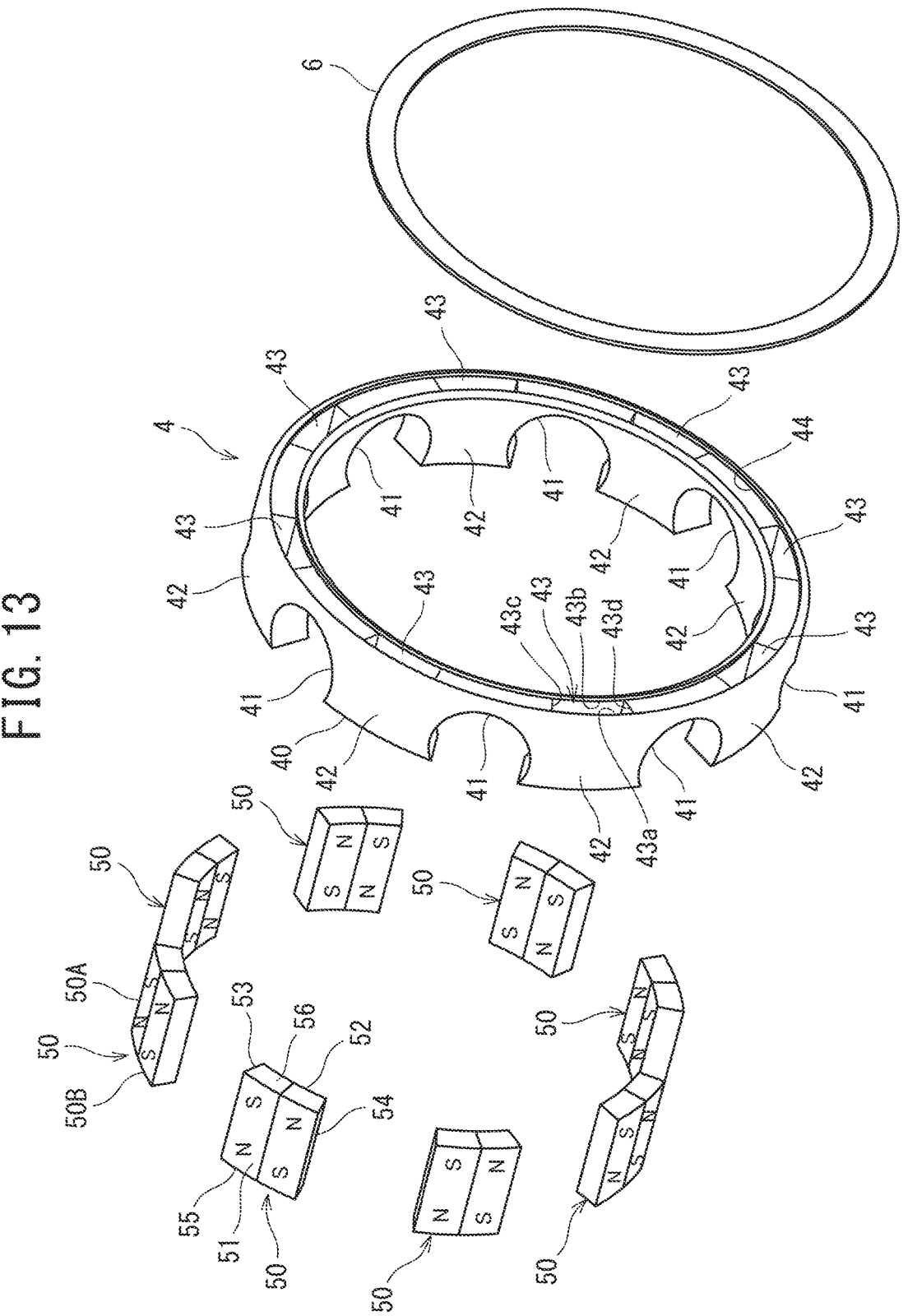

WIRELESS SENSOR-EQUIPPED BEARING

TECHNICAL FIELD

The present invention relates to a wireless sensor-equipped bearing including a power generation mechanism.

BACKGROUND ART

As an example of related art of a wireless sensor-equipped bearing, there is known a wireless sensor-equipped bearing having, as a power generation mechanism, electromagnetic induction which causes an induction current in a coil by a magnetic flux density variation due to relative rotation between a magnet and a coil which are provided in the inside of the bearing (see, for example, PTLs 1 to 4).

The wireless sensor-equipped bearing having electromagnetic induction as a power generation mechanism includes a circuit configured to supply an electric current, which is generated in the coil by electromagnetic induction, to a power-supplied unit, and a circuit configured to convert detection information detected by a sensor to a wireless signal. PTLs 1-4 are silent on measures to reduce noise caused on these circuits due to the electromagnetic induction.

In addition, in the wireless sensor-equipped bearing described in PTL 3, a sensor unit is provided on a seal which seals the bearing space of a rolling bearing. This sensor unit includes a sensor configured to detect information of the state of the rolling bearing; information handling means for handling the information detected by the sensor; and a power supply having a power generation function which can drive the information handling means and the sensor.

Specifically, it can be said that the invention described in PTL 3 aims at obtaining a wireless sensor-equipped bearing having a power generation function, by simply replacing the seal of a conventional rolling bearing with a sensor unit-equipped seal.

However, PTL 3 describes that, as regards the power supply, it is possible to apply power generation mechanisms which use a Seebeck element that is a thermoelectric power generating element, or an electret element that is a vibration power generating element. In these power generation mechanisms, at a low-speed rotation time at an initial stage of use of the rolling mechanism, it is difficult to obtain necessary power since the temperature difference between the obverse and reverse surfaces of the seal or the vibration occurring in the seal is small.

In addition, PTL 4 discloses technology in which an annular magnet having N poles and S poles arranged alternately in the circumferential direction is fixed to one of an inner ring and an outer ring. An annular conductor, which is opposed to this magnet in the axial direction, is fixed to the other of the inner ring and outer ring, and electromotive force is generated by relative rotation between the magnet and conductor. This annular magnet and this conductor are required in addition to the structural parts of the conventional rolling bearing.

CITATION LIST

Patent Literature

PTL 1: JP 2006-170624 A
PTL 2: JP 2006-90501 A
PTL 3: JP 2012-149716 A
PTL 4: JP 2003-97582 A

SUMMARY OF INVENTION

Technical Problem

The problem to be solved by the invention is to provide a wireless sensor-equipped bearing configured to generate power by electromagnetic induction, with the occurrence of noise on a circuit unit due to the electromagnetic induction being suppressed, and to provide a wireless sensor-equipped bearing configured to generate power by electromagnetic induction, which is easily obtained by, for example, replacing structural parts of a conventional rolling bearing, and which can obtain necessary electric power and exhibit a sensor function even at an initial stage of use or at a low-speed rotation time.

Solution to Problem

In order to solve the above problem, a wireless sensor-equipped bearing, which is a first aspect of the invention, satisfies the following structural requirements (1) to (3):

(1) To include a coil fixed to one of two bearing parts configured to rotate relative to each other, a magnet fixed to the other of the two bearing parts, the magnet having a face opposed to the coil, and a sensor fixed to a bearing part;

(2) To include a circuit unit including a power supply circuit configured to supply to a power-supplied unit an electric current occurring in the coil by electromagnetic induction due to relative rotation between the magnet and the coil, an arithmetic circuit configured to calculate a detection value from detection information detected by the sensor, and a wireless circuit configured to produce a wireless signal including a calculation result by the arithmetic circuit; and (3) To include a magnetic shield configured to magnetically shield at least the wireless circuit of the circuit unit from the magnet, and an antenna configured to transmit the wireless signal.

A wireless sensor-equipped bearing, which is a second aspect of the invention, satisfies the following structural requirements (11) to (17):

(11) To include an inner ring having an inner ring raceway surface on an outer peripheral surface of the inner ring, an outer ring having, on an inner peripheral surface of the outer ring, an outer ring raceway surface disposed to be opposed to the inner ring raceway surface, and a rolling element disposed in a raceway formed by the inner ring raceway surface and the outer ring raceway surface;

(12) To include a retainer formed of an annular body, the retainer including a pocket configured to rotatably hold the rolling element, the pocket penetrating a peripheral surface of the annular body, and a plurality of the pockets being formed in a circumferential direction of the annular body;

(13) To include a plurality of magnets fixed between the pockets of the retainer such that an N pole and an S pole of the magnets neighbor in the circumferential direction of the annular body;

(14) To include a first seal configured to effect sealing between the inner ring and the outer ring at an axial one-end portion, the first seal being configured to rotate relative to the retainer, a coil fixed to a surface of the first seal, the surface of the first seal being opposed to the magnet, and a second seal configured to effect sealing between the inner ring and the outer ring at an axial other-end portion;

(15) To include a sensor disposed on any one of the inner ring, the outer ring and the first seal;

(16) To include a circuit unit formed on the first seal, the circuit unit including a power supply circuit configured to supply to a power-supplied unit an electric current occurring in the coil by electromagnetic induction due to relative rotation between the magnet and the coil, an arithmetic circuit configured to calculate a detection value from detection information detected by the sensor, and a wireless circuit configured to produce a wireless signal including a calculation result by the arithmetic circuit; and

(17) To include an antenna configured to transmit the wireless signal, the antenna being fixed to the first seal.

Advantageous Effects of Invention

The wireless sensor-equipped bearing of the first aspect is a wireless sensor-equipped bearing which generates power by electromagnetic induction. The occurrence of noise to the circuit unit due to the electromagnetic induction is suppressed by the magnetic shield.

The wireless sensor-equipped bearing of the second aspect is a wireless sensor-equipped bearing which can be obtained by simply replacing a retainer and a seal of a conventional rolling bearing. Even at an initial stage of use or at a low-speed rotation time, necessary electric power can be obtained and a sensor function can be exhibited.

BRIEF DESCRIPTION OF DRAWINGS

FIG. 2 is a perspective view illustrating magnets, a retainer and a yoke, which constitute the wireless sensor-equipped bearing of the first embodiment;

FIG. 9A is a perspective view illustrating a state in which a first seal is removed from the wireless sensor-equipped bearing of the fourth embodiment, and FIG. 9B is a perspective view illustrating a core metal of the first seal;

FIG. 13 is a perspective view illustrating magnets, a retainer and a yoke, which constitute the wireless sensor-equipped bearing of the fifth embodiment;

DESCRIPTION OF EMBODIMENTS

Embodiments of the present invention will now be described with reference to the drawings. However, this invention is not limited to the embodiments below. In the embodiments, technically preferable limitations for implementing the invention are added, but these limitations are not indispensable to the invention.

First Embodiment

Figure 1:
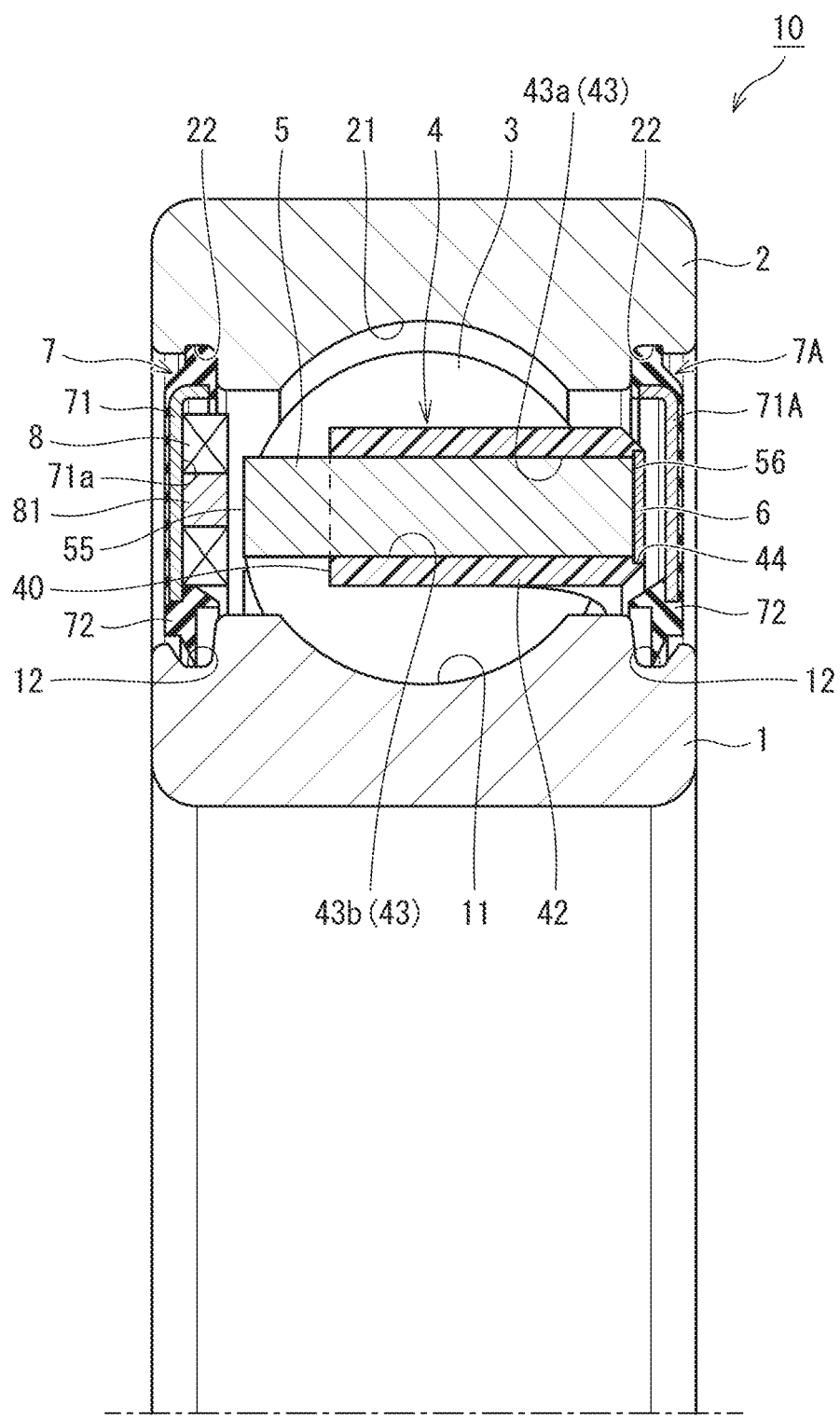
FIG. 1 is a cross-sectional view illustrating a wireless sensor-equipped bearing according to a first embodiment.

As illustrated in FIG. 1 and FIG. 2, a wireless sensor-equipped bearing 10 of this embodiment includes an inner ring 1, an outer ring 2, balls (rolling elements) 3, a retainer 4, eight (a plurality of, an even number of) magnets 5, a yoke 6, a first seal 7 and a second seal 7A.

An inner ring raceway surface 11 is formed on an axial middle portion of an outer peripheral surface of the inner ring 1. Circumferential grooves 12 for disposing the seals are formed at both axial end portions of the outer peripheral surface of the inner ring 1. An outer ring raceway surface 21 is formed on an axial middle portion of an inner peripheral surface of the outer ring 2. Seal attachment grooves 22 are formed at both axial end portions of the inner peripheral surface of the outer ring 2. The inner ring raceway surface 11 and outer ring raceway surface 21 are disposed to be opposed to each other. The balls 3 are disposed in a raceway formed by the inner ring raceway surface 11 and outer ring raceway surface 21.

As illustrated in FIG. 2, the retainer 4 is formed of an annular body and includes pockets 41 which rotatably hold the balls 3. The pockets 41 penetrate the peripheral surface of the retainer 4. An axial one-end face 40 of the retainer 4 is opened at pockets 41. In short, the retainer 4 is a crown retainer. Eight (a plurality of, an even number of) pockets 41 are formed in the circumferential direction of the retainer 4. Through-holes 43, which extend in the axial direction, are formed in portions (columnar portions) 42 between neighboring pockets 41 of the retainer 4.

The inner surfaces of the through-hole 43 include a large-diameter surface 43a on the outer peripheral side of the retainer 4, a small-diameter surface 43b on the inner peripheral side, and a pair of opposed faces 43c and 43d extending along the radial direction of the retainer 4. The through-holes 43 are formed one by one in all columnar portions 42. An annular recess portion 44, which is recessed in the axial direction, is formed in an axial other-end face of the retainer 4.

The magnets 5 are neodymium magnets. The magnets 5 are disposed one by one in all through-holes 43 such that the N pole and S pole of each magnet are arranged in the axial direction of the retainer 4 and such that the N pole and the S pole of the magnets neighbor in the circumferential direction of the retainer 4. The magnet 5 has a shape corresponding to the inner surfaces of the through-hole 43 of the retainer 4. The magnet 5 has an outer surface 51 corresponding to the large-diameter surface 43a of the through-hole 43, an inner surface 52 corresponding to the small-diameter surface 43b of the through-hole 43, outer faces 53 and 54 corresponding to the pair of opposed faces 43c and 43d of the through-hole 43, an axial one-end face 55 on the axial one-end face 40 side of the retainer 4, and an axial other-end face 56 which is opposite to the axial one-end face 55.

Figure 3B:
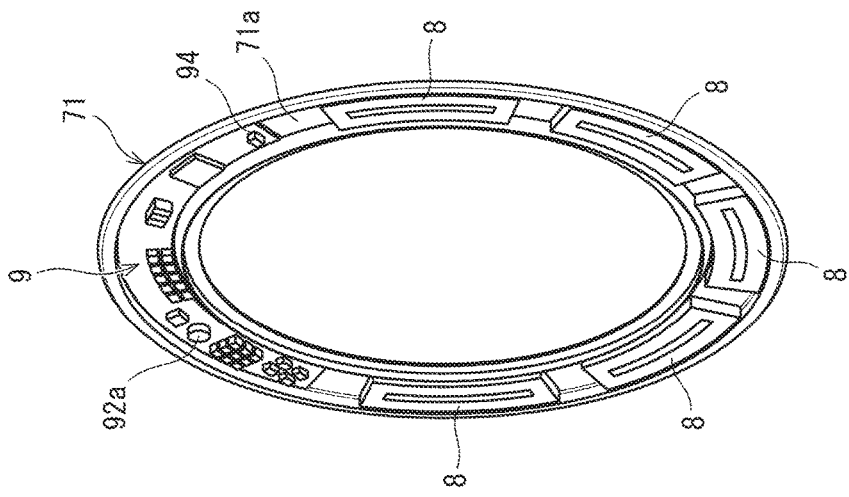
FIG. 3A is a perspective view illustrating a state in which a first seal is removed from the wireless sensor-equipped bearing of the first embodiment, and FIG. 3B a perspective view illustrating a core metal of the first seal.
Figure 3A:
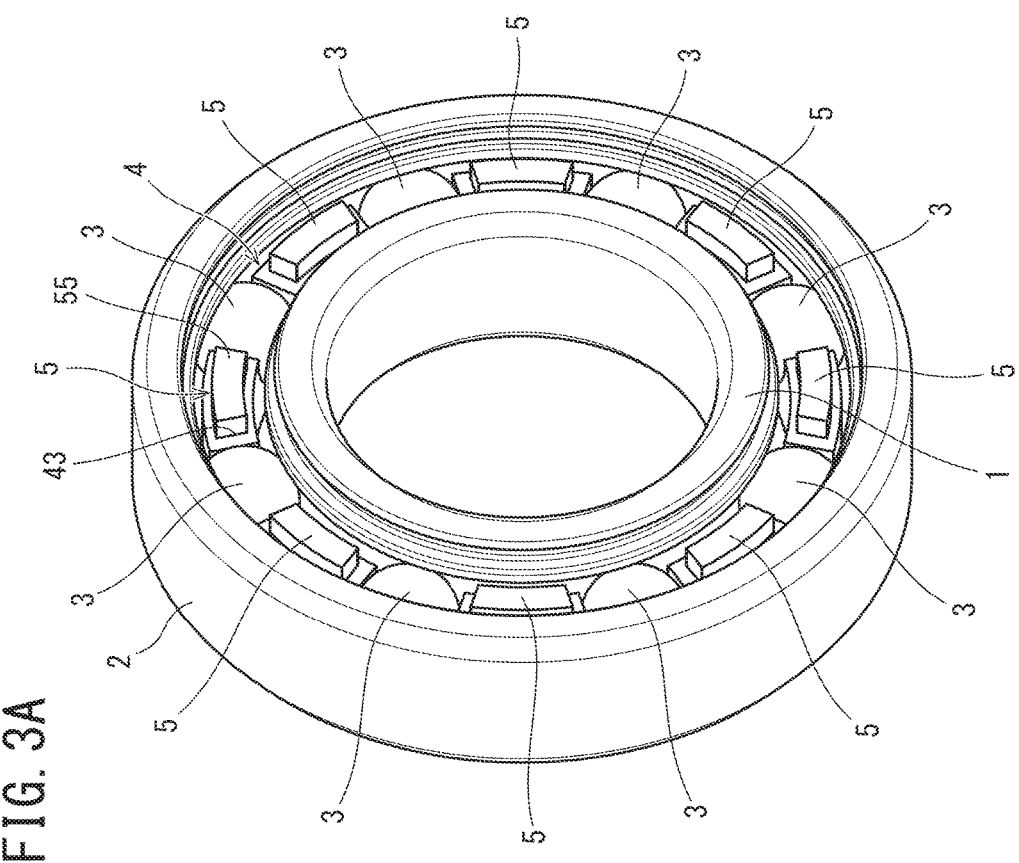

A distance (a dimension in the axial direction) between the axial one-end face 55 and axial other-end face 56 of the magnet 5 is greater than an axial dimension of the retainer 4. Thus, as illustrated in FIG. 1 and FIG. 3A, the magnet 5 disposed in the through-hole 43 projects from the axial one-end face 40 of the retainer 4.

As illustrated in FIG. 2, the yoke 6 is an annular metal plate and has such a dimension as to fit in the recess portion 44 of the retainer 4. As illustrated in FIG. 1, the yoke 6 is fitted in the recess portion 44, and is put in contact with the axial other-end face 56 of the magnet 5 disposed in the through-hole 43. The yoke 6 is formed of a material with a high relative magnetic permeability such as electrical steel.

In order to prevent degradation of the magnets 5 and yoke 6, it is preferable to cover the surfaces of the magnets 5 and yoke 6 with a fluoro-rubber coating film or an evaporation-deposited film of parylene (common name of "polyparaxylene"). The retainer 4 is formed of a nonmagnetic material such as 6, 6-nylon. When the retainer 4 is fabricated by injection molding, it is preferable that the magnets 5 and yoke 6 are disposed in a mold and formed as one piece. The magnets 5 may be put and adhered in the through-holes 43 of the injection-molded retainer 4, and the yoke 6 may be fitted and adhered in the recess portion 44.

As illustrated in FIG. 1, the first seal 7 is composed of a core metal 71 and a rubber-made seal portion 72. As illustrated in FIG. 1 and FIG. 3B, a plurality of coils 8 and one circuit board 9 are fixed to an inside surface (a surface opposed to the magnets 5) 71a of the core metal 71 of the first seal 7. The core metal 71 is formed of a material with a high relative magnetic permeability such as electrical steel. An insulation film is formed on the inside surface 71a of the core metal 71.

A core metal 81 of the coil 8 is formed of a material with a high relative magnetic permeability such as electrical steel. In order to improve a power generation amount by electromagnetic induction caused by the relative rotation between the coil 8 and magnets 5, use may be made of the coil 8 in which thin-film coils are stacked, or the coil 8 in which a metal wire with a diameter of 0.01 mm or less is wound.

As illustrated in FIG. 1, the first seal 7 is disposed between the inner ring 1 and outer ring 2 by disposing an inner peripheral portion of the seal portion 72 in the circumferential groove 12 of the inner ring 1 and by fitting an outer peripheral portion of the seal portion 72 in the seal attachment groove 22 of the outer ring 2 in an elastically deformed state. Specifically, the first seal 7 is fixed to the outer ring 2.

As illustrated in FIG. 1, the second seal 7A is an ordinary seal composed of a core metal 71A and a rubber-made seal portion 72. The second seal 7A is disposed between the inner ring 1 and outer ring 2 by disposing an inner peripheral portion of the seal portion 72 in the circumferential groove 12 of the inner ring 1 and by fitting an outer peripheral portion of the seal portion 72 in the seal attachment groove 22 of the outer ring 2 in an elastically deformed state. Specifically, the second seal 7A is fixed to the outer ring 2.

Figure 4:
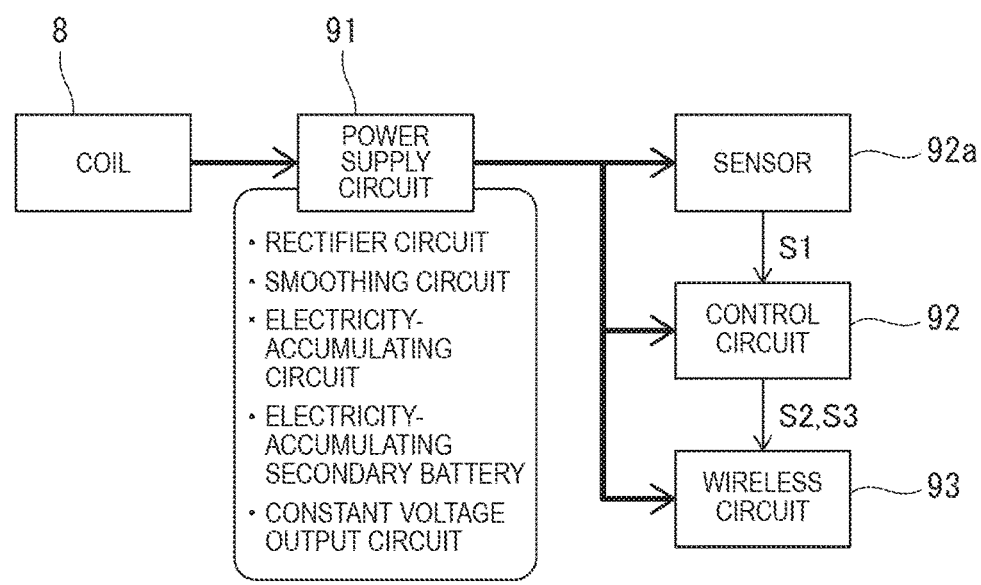
FIG. 4 is a diagram illustrating a circuit configuration which the wireless sensor-equipped bearings of first, second and third embodiments include.

As illustrated in FIG. 3B and FIG. 4, the circuit board (circuit unit) 9 includes a power supply circuit 91, a control circuit 92, a wireless circuit 93 and an antenna 94. At least one sensor 92a, which is among an acceleration sensor, a temperature sensor, a rotation sensor and a load sensor, is provided on the control circuit 92. The power supply circuit 91 rectifies and smooths a current occurring in the coils 8 by electromagnetic induction, supplies the resultant current to power-supplied units (sensor 92a, control circuit 92 and wireless circuit 93), and accumulates the current. For this purpose, the power supply circuit 91 includes a rectifier circuit, a smoothing circuit, an electricity-accumulating circuit, an electricity-accumulating secondary battery and a constant voltage output circuit.

The control circuit (arithmetic circuit) 92 calculates information S1 which is detected by the sensor 92a, and outputs to the wireless circuit 93 a signal S2 indicative of the calculation result and a control signal S3 indicative of a transmission cycle of the calculation result. The wireless circuit 93 converts the signal S2 indicative of the calculation result from the control circuit 92 to a wireless signal at a transmission cycle corresponding to the control signal S3, and outputs the wireless signal to the antenna 94. The antenna 94 wirelessly transmits a wireless signal indicative of the calculation result (information detected by the sensor 92a) to a receiving terminal provided on the outside at predetermined cycles.

As described above, although the plural coils 8 and one circuit board 9 are fixed to the inside surface 71a of the core metal 71 of the first seal 7, it is preferable to further cover these parts with a protection cover. Thereby, the coils 8, circuit board 9 and antenna 94 can be prevented from being contaminated by grease filled in the inside of the bearing and by abrasion powder occurring at a time of use.

The wireless sensor-equipped bearing 10 of this embodiment is used in a state in which the outer ring 2 is fixed to a housing and a shaft is engaged in the inner ring 1. If the shaft is rotated in this state, the inner ring 1 rotates together with the retainer 4, and the first seal 7 fixed to the outer ring 2 does not rotate (i.e. the first seal 7 and retainer 4 rotate relative to each other). Thus, relative rotation occurs between the coils 8 fixed to the first seal 7 and the magnets 5 fixed to the retainer 4.

Accordingly, electromagnetic induction occurs by a magnetic flux density variation due to the relative rotation between the coils 8 and magnets 5. An electric current generated in the coils 8 by the electromagnetic induction is rectified and smoothed by the power supply circuit 91, and the current is supplied to the power-supplied units (sensor 92a, control circuit 92 and wireless circuit 93) and accumulated in the secondary battery.

By the supplied current, the sensor 92a, control circuit 92 and wireless circuit 93 are driven. The control circuit 92 calculates the information S1 detected by the sensor 92a, and the signal S2 indicative of the calculation result and the control signal S3 indicative of the transmission cycle of the calculation result are output to the wireless circuit 93. In conjunction with this, in the wireless circuit 93, the signal S2 indicative of the calculation result from the control circuit 92 is converted to a wireless signal at a transmission cycle corresponding to the control signal S3, and the wireless signal is output to the antenna 94. As a result, from the antenna 94, a signal indicative of the information detected by the sensor 92a is wirelessly transmitted to a receiving terminal provided on the outside at predetermined cycles.

The wireless sensor-equipped bearing 10 of this embodiment requires no new processing on the inner ring 1 and outer ring 2 of the conventional rolling bearing. In addition, the wireless sensor-equipped bearing 10 can easily be obtained by replacing one of two second seals 7A, which are used in the conventional rolling bearing, with the first seal 7 on which the coils 8 and circuit board 9 are fixed, and by replacing a crown retainer used in the conventional rolling bearing with the retainer 4 having the magnets 5.

Besides, the wireless sensor-equipped bearing 10 of this embodiment performs power generation by electromagnetic induction between the coils 8 and magnets 5. Thus, even at an initial time of use when vibration is small or at a low-speed rotation time, necessary electric power can be obtained and a sensor function can be exhibited. Power generation at such times was difficult in the wireless sensor-equipped bearing which performs power generation by using a Seebeck element that is a thermoelectric power generating element, or an electret element that is a vibration power generating element.

Additionally, the coils 8 and circuit board 9 are fixed to the first seal 7, the through-holes 43 are provided in the columnar portions 42 of the retainer 4, and the magnets 5 disposed in the through-holes 43 are made to project toward the first seal 7 side. Therefore, compared to the conventional rolling bearing, a decrease of the inside space of the bearing is small.

Additionally, by virtue of the structure in which most parts of the magnets 5 are buried in the retainer 4, it is possible to use magnets with great perpendicular field variations to the coils 8. As a result, compared to the structure in which the amount of burying of magnets is small, the power generation efficiency is enhanced.

Additionally, in the wireless sensor-equipped bearing 10 of this embodiment, the circuit board 9 is configured such that the antenna 94 wirelessly transmits the signal indicative of calculation result to the receiving terminal provided on the outside at predetermined cycles. Thereby, the wireless circuit 93 and antenna 94 operate only at a time of calculation and at a time of wireless transmission. Therefore, compared to the structure in which the wireless circuit 93 and antenna 94 operate at all times, the power consumption can be reduced.

In the wireless sensor-equipped bearing 10 of this embodiment, the antenna 94 is formed on a component mounting surface of the circuit board 9. However, it is possible to form an antenna on a surface of the circuit board 9 opposite to the component mounting surface, and to project the antenna to the outside of the bearing from the first seal 7 by providing a hole in the core metal 71 and seal portion 72.

Additionally, in the wireless sensor-equipped bearing 10 of this embodiment, the power supply circuit 91, control circuit 92, wireless circuit 93 and antenna 94 are formed on the single circuit board 9, and this circuit board 9 is fixed to the core metal 71. However, the power supply circuit 91, control circuit 92, wireless circuit 93 and antenna 94 may be formed on different boards. Moreover, the power supply circuit 91, control circuit 92, wireless circuit 93 and antenna 94 may be directly formed on an insulation film formed on the inside surface 71a of the core metal 71.

Additionally, in the wireless sensor-equipped bearing 10 of this embodiment, since the sensor is formed on the control circuit 92 (i.e. on the core metal 71 of the first seal 7), no new processing is needed on the inner ring 1 and outer ring 2 which constitute the conventional rolling bearing, and no projecting portion exists on the outside.

However, the sensor may be fixed to at least any one of the axial end face, outer peripheral surface and inner peripheral surface of the outer ring 2 to which the first seal 7 is fixed. When the first seal 7 is fixed to the inner ring, the sensor may be fixed to at least any one of the axial end face, outer peripheral surface and inner peripheral surface of the inner ring. Besides, a recess portion for fixing the sensor may be provided in any one of these faces and surfaces.

Additionally, in the wireless sensor-equipped bearing 10 of this embodiment, although neodymium magnets are used as the magnets 5, other magnets such as samarium-cobalt magnets may be used.

Additionally, in the wireless sensor-equipped bearing 10 of this embodiment, the magnet 5 projects from the axial one-end face 40 of the retainer 4. However, the axial one-end face 55 of the magnet 5 may be flush with the axial one-end face 40 of the retainer 4 or may be positioned inside the axial one-end face 40 of the retainer 4. Furthermore, the axial one-end face 55 of the magnet 5 may be positioned inside the axial one-end face 40 of the retainer 4, and when the retainer 4 is fabricated by injection molding of synthetic resin, the magnet 5 may be integrally formed such that the axial one-end face 55 is thinly covered with the synthetic resin.

Specifically, it should suffice if the plural magnets 5 are fixed such that the N pole and S pole of the magnets neighbor in the circumferential direction of the retainer 4 that is the annular body, and the magnets 5 are in a state in which electromagnetic induction occurs between the coils 8 and the magnets 5. In a case in which the axial one-end face 55 of the magnet 5 is covered with synthetic resin, the magnet 5 is opposed to the coil 8 via a coating portion of the synthetic resin.

Second Embodiment

Figure 5:
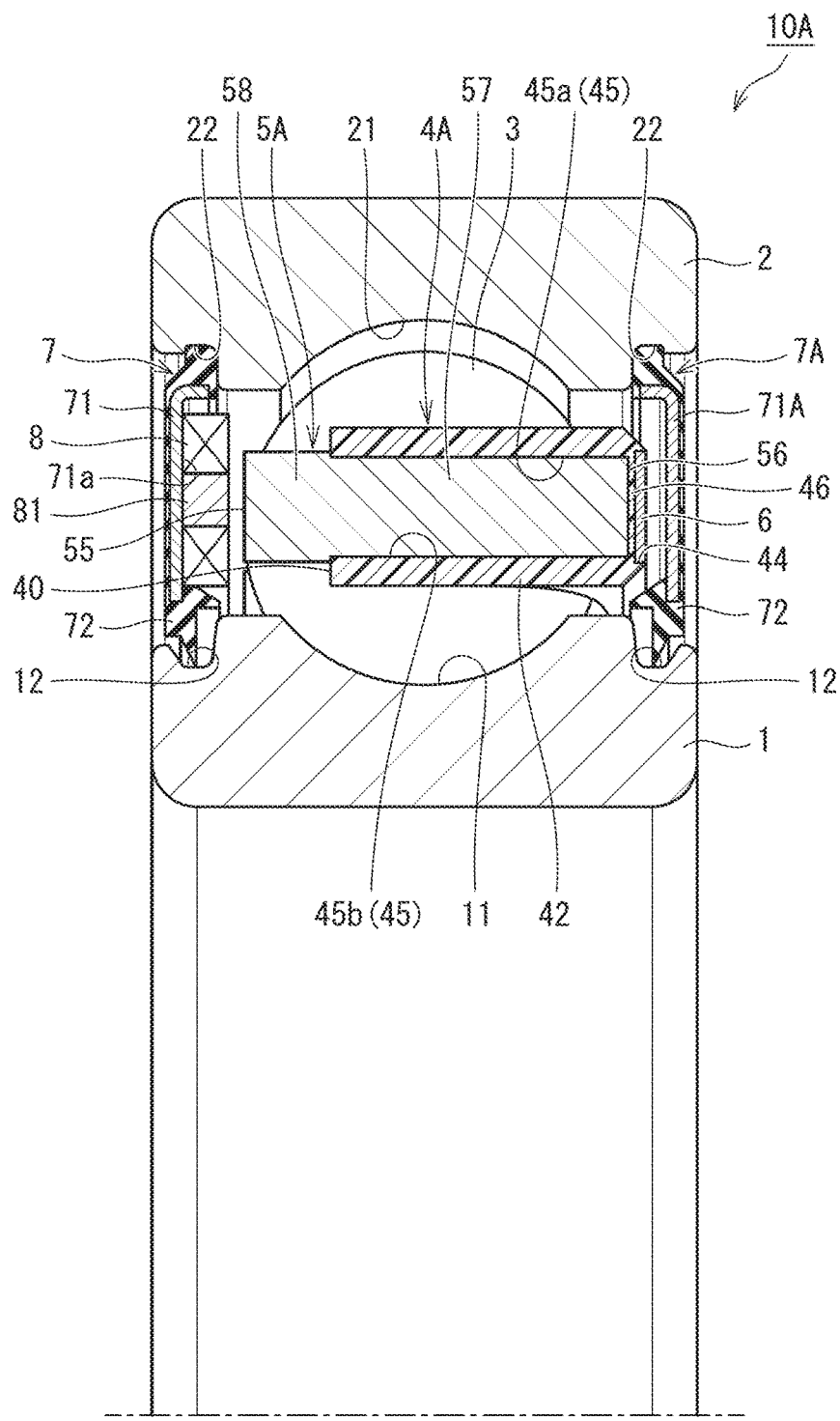
FIG. 5 is a cross-sectional view illustrating a wireless sensor-equipped bearing of the second embodiment.

As illustrated in FIG. 5, a wireless sensor-equipped bearing 10A according to a second embodiment includes an inner ring 1, an outer ring 2, balls (rolling elements) 3, a retainer 4A, magnets 5A, a yoke 6, a first seal 7 and a second seal 7A. This wireless sensor-equipped bearing 10A is the same as the wireless sensor-equipped bearing 10 of the first embodiment except for the shapes of the retainer 4A and magnets 5A.

A recess portion 45, which is recessed in the axial direction from the axial one-end face 40, is formed in the portion (columnar portion) 42 between neighboring pockets of the retainer 4A. The recess portions 45 are formed one by one in all columnar portions 42. In short, the retainer 4A includes the recess portions 45 in place of the through-holes 43 of the retainer 4 of the first embodiment. In the other respects, the retainer 4A is the same as the retainer 4 of the first embodiment.

The magnets 5A are disposed one by one in all recess portions 45 such that the N pole and S pole neighbor in the circumferential direction of the retainer 4A. The magnet 5A includes a base portion 57 disposed in the recess portion 45 of the retainer 4A, and a projecting portion 58 projecting from the axial one-end face 40 of the retainer 4A. The base portion 57 is thinner than the projecting portion 58 and includes a stepped portion at a boundary between the base portion 57 and projecting portion 58.

The base portion 57 has a shape corresponding to the inner surfaces of the recess portion 45 of the retainer 4A. Specifically, the base portion 57 includes an outer surface corresponding to a large-diameter surface 45a of the recess portion 45, an inner surface corresponding to a small-diameter surface 45b of the recess portion 45, etc. The projecting portion 58 includes an axial one-end face 55 on the axial one-end face 40 side of the retainer 4. The base portion 57 includes an axial other-end face 56 which is opposite to the axial one-end face 55.

The base portion 57 of the magnet 5A is put in the recess portion 45 of the retainer 4A, and the yoke 6 is fitted in the recess portion 44. Thereby, the base portion 57 and yoke 6 attract each other via a bottom plate 46 of the recess portion 45. Thus, in the wireless sensor-equipped bearing 10A of this embodiment, the magnets 5A and yoke 6 can be fixed to the retainer 4A without using an adhesive.

Third Embodiment

Figure 6:
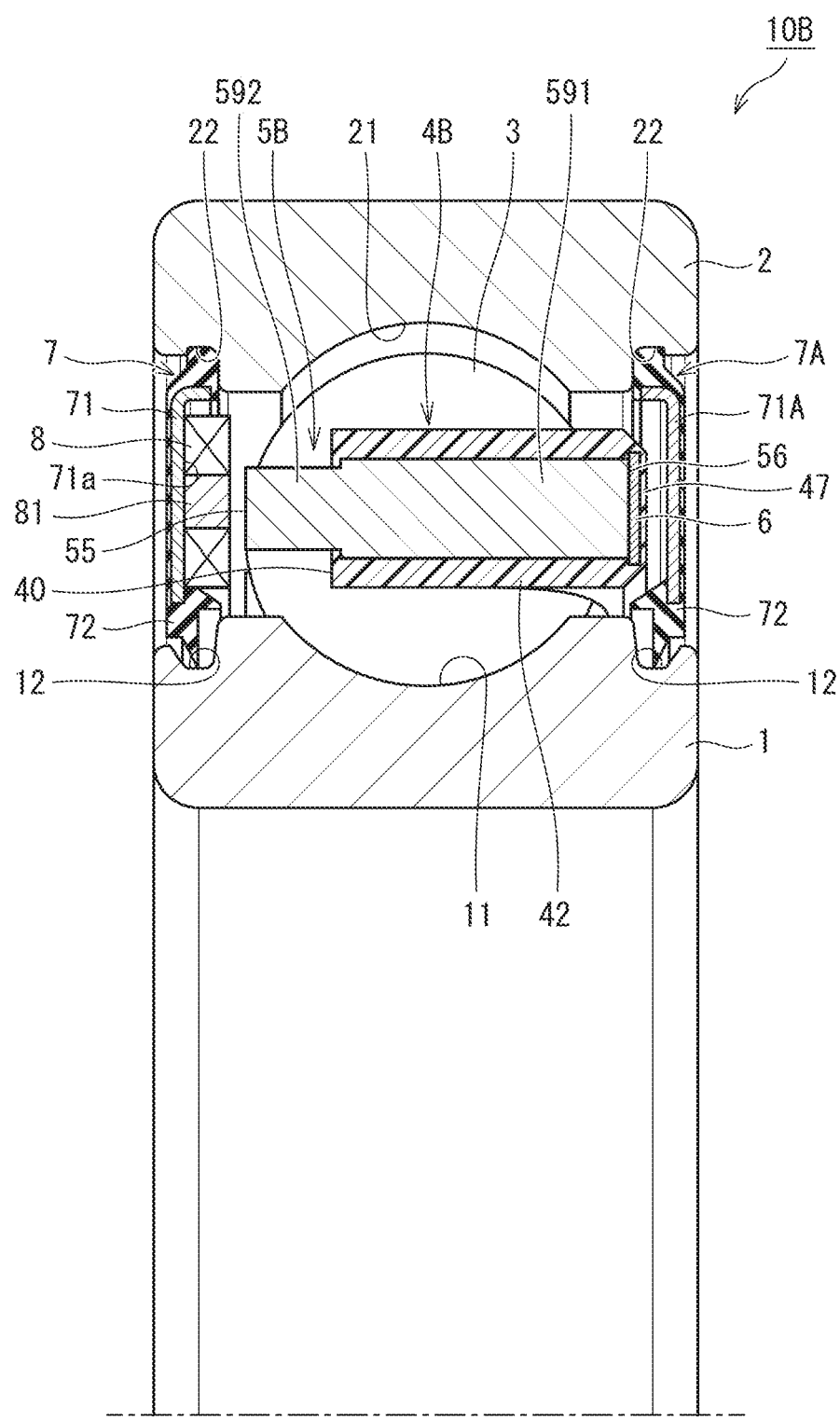
FIG. 6 is a cross-sectional view illustrating a wireless sensor-equipped bearing of the third embodiment.

As illustrated in FIG. 6, a wireless sensor-equipped bearing 10B according to a third embodiment includes an inner ring 1, an outer ring 2, balls (rolling elements) 3, a retainer 4B, magnets 5B, a yoke 6, a first seal 7 and a second seal 7A. This wireless sensor-equipped bearing 10B is the same as the wireless sensor-equipped bearing 10 of the first embodiment except for the shapes of the retainer 4B and magnets 5B and the fixation position of the yoke 6.

The magnet 5B is composed of a base portion 591 and a projecting portion 592 which are different in thickness in the axial direction of the retainer 4B. The base portion 591 of the magnet 5B is thicker than the projecting portion 592 and includes a stepped portion at a boundary between the base portion 591 and projecting portion 592.

In this wireless sensor-equipped bearing 10B, when the retainer 4B is fabricated by injection molding, the magnet 5B and yoke 6 are disposed in a mold and integrally formed. Thereby, the magnets 5B are disposed one by one in the portions (columnar portions) 42 between the neighboring pockets of the retainer 4B such that the N pole and S pole neighbor in the circumferential direction of the retainer 4B.

The projecting portion 592 of the magnet 5B, excluding a part thereof on the stepped portion side, projects from the axial one-end face 40 of the retainer 4B. The entirety of the base portion 591 of the magnet 5B is disposed in the retainer 4B. The yoke 6 is put in contact with the axial other-end face 56 of the magnet 5B. A bottom portion 47 of the retainer 4B exists outside the yoke 6.

Fourth Embodiment

Figure 7:
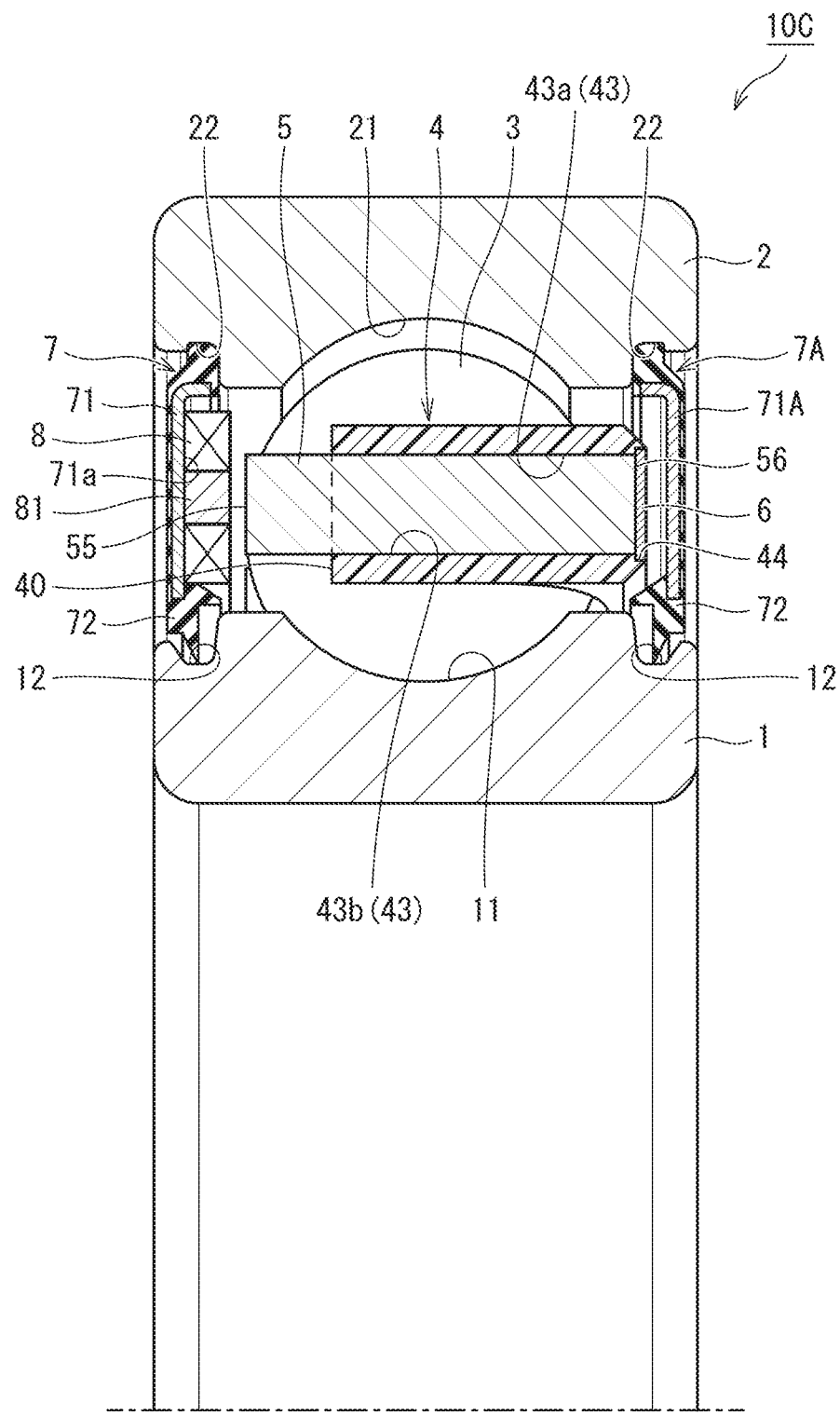
FIG. 7 is a cross-sectional view illustrating a wireless sensor-equipped bearing of a fourth embodiment, FIG. 7 being a view corresponding to an A-A cross section in FIG. 9B.
Figure 8:
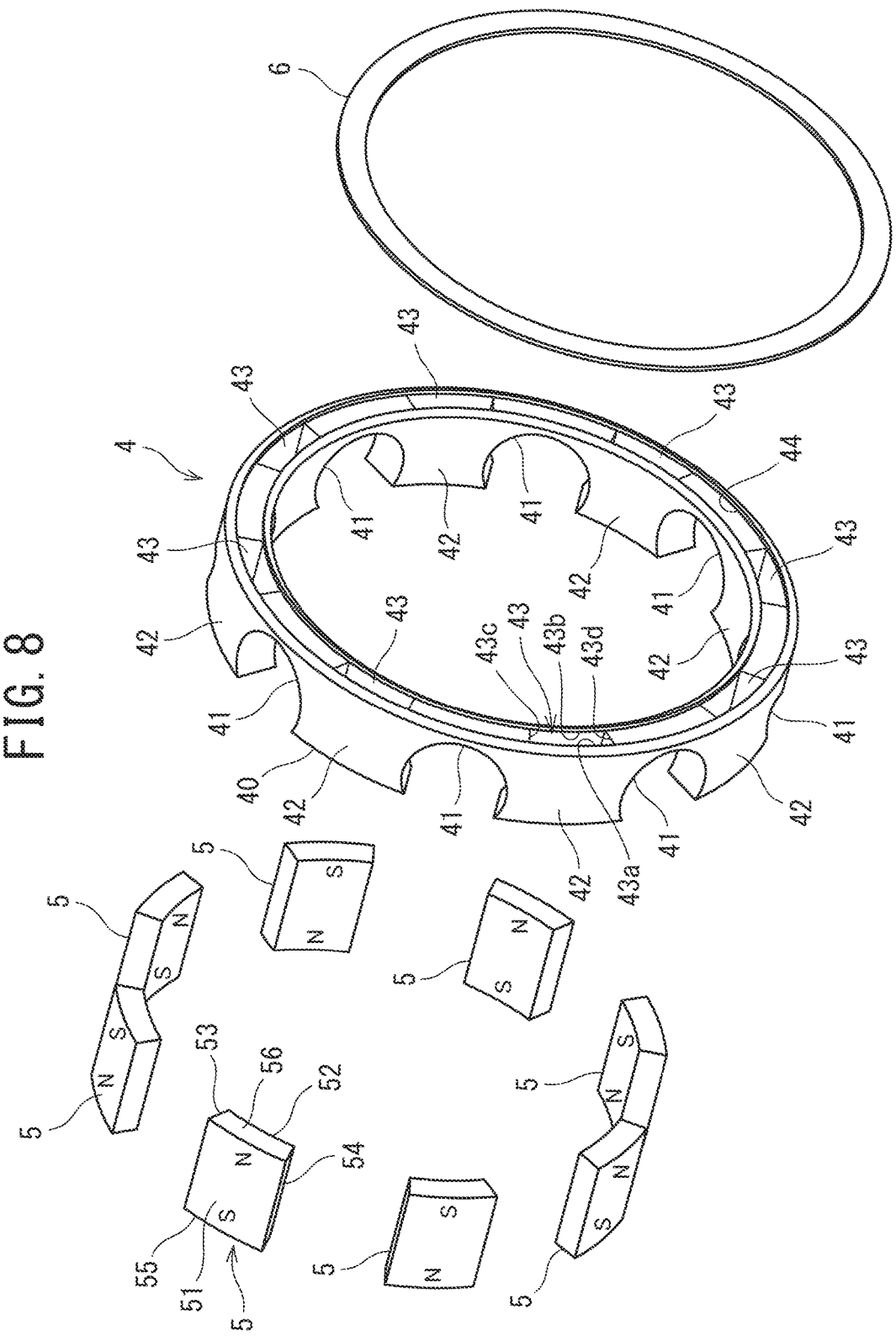
FIG. 8 is a perspective view illustrating magnets, a retainer and a yoke, which constitute the wireless sensor-equipped bearing of the fourth embodiment.

As illustrated in FIG. 7 and FIG. 8, a wireless sensor-equipped bearing 10C of the present embodiment includes an inner ring (bearing part) 1, an outer ring (bearing part) 2, balls (rolling elements) 3, a retainer (bearing part) 4, eight (a plurality of, an even number of) magnets 5, a yoke 6, a first seal (bearing part) 7 and a second seal 7A.

An inner ring raceway surface 11 is formed on an axial middle portion of an outer peripheral surface of the inner ring 1. Circumferential grooves 12 for disposing the seals are formed at both axial end portions of the outer peripheral surface of the inner ring 1. An outer ring raceway surface 21 is formed on an axial middle portion of an inner peripheral surface of the outer ring 2. Seal attachment grooves 22 are formed at both axial end portions of the inner peripheral surface of the outer ring 2. The inner ring raceway surface 11 and outer ring raceway surface 21 are disposed to be opposed to each other. The balls 3 are disposed in a raceway formed by the inner ring raceway surface 11 and outer ring raceway surface 21.

As illustrated in FIG. 8, the retainer 4 is formed of an annular body and includes pockets 41 which rotatably hold the balls 3. The pockets 41 penetrate the peripheral surface of the retainer 4. An axial one-end face 40 of the retainer 4 is opened at the pockets 41. In short, the retainer 4 is a crown retainer. Eight (a plurality of) pockets 41 are formed in the circumferential direction of the retainer 4. Through-holes 43, which extend in the axial direction, are formed in portions (columnar portions) 42 between neighboring pockets 41 of the retainer 4.

The inner surfaces of the through-hole 43 include a large-diameter surface 43a on the outer peripheral side of the retainer 4, a small-diameter surface 43b on the inner peripheral side, and a pair of opposed faces 43c and 43d extending along the radial direction of the retainer 4. The through-holes 43 are formed one by one in all columnar portions 42. An annular recess portion 44, which is recessed in the axial direction, is formed in an axial other-end face of the retainer 4.

The magnets 5 are neodymium magnets. The magnets 5 are disposed one by one in all through-holes 43 such that the N pole and S pole of each magnet are arranged in the axial direction of the retainer 4 and such that the N pole and S pole of the magnets neighbor in the circumferential direction of the retainer 4. The magnet 5 has a shape corresponding inner surfaces of the through-hole 43 of the retainer 4. The magnet 5 has an outer surface 51 corresponding to the large-diameter surface 43a of the through-hole 43, an inner surface 52 corresponding to the small-diameter surface 43b of the through-hole 43, outer faces 53 and 54 corresponding to the pair of opposed faces 43c and 43d of the through-hole 43, an axial one-end face 55 on the axial one-end face 40 side of the retainer 4, and an axial other-end face 56 which is opposite to the axial one-end face 55.

A distance (a dimension in the axial direction) between the axial one-end face 55 and axial other-end face 56 of the magnet 5 is greater than an axial dimension of the retainer 4. Thus, as illustrated in FIG. 7 and FIG. 9A, the magnet 5 disposed in the through-hole 43 projects from the axial one-end face 40 of the retainer 4.

As illustrated in FIG. 8, the yoke 6 is an annular metal plate and has such a dimension as to fit in the recess portion 44 of the retainer 4. As illustrated in FIG. 7, the yoke 6 is fitted in the recess portion 44, and is put in contact with the axial other-end face 56 of the magnet 5 disposed in the through-hole 43. The yoke 6 is formed of a material with a high relative magnetic permeability such as electrical steel.

In order to prevent degradation of the magnets 5 and yoke 6, it is preferable to cover the surfaces of the magnets 5 and yoke 6 with a fluoro-rubber coating film or an evaporation-deposited film of parylene (common name of "polyparaxylene"). The retainer 4 is formed of a nonmagnetic material such as 6, 6-nylon. When the retainer 4 is fabricated by injection molding, it is preferable that the magnets 5 and yoke 6 are disposed in a mold and formed as one piece. The magnets 5 may be put and adhered in the through-holes 43 of the injection-molded retainer 4, and the yoke 6 may be fitted and adhered in the recess portion 44.

As illustrated in FIG. 7, the first seal 7 is composed of a core metal 71 and a rubber-made seal portion 72. As illustrated in FIG. 7 and FIG. 9B, a plurality of coils S and one circuit board 9 are fixed to an inside surface (a surface opposed to the magnets 5) 71a of the core metal 71 of the first seal 7. The core metal 71 is formed of a material with a high relative magnetic permeability such as electrical steel. An insulation film is formed on the inside surface 71a of the core metal 71.

A core metal 81 of the coil 8 is formed of a material with a high relative magnetic permeability such as electrical steel. In order to improve a power generation amount by electromagnetic induction caused by the relative rotation between the coil 8 and magnets 5, use may be made of the coil 8 in which thin-film coils are stacked, or the coil 8 in which a metal wire with a diameter of 0.01 mm or less is wound.

As illustrated in FIG. 7, the first seal 7 is disposed between the inner ring 1 and outer ring 2 by disposing an inner peripheral portion of the seal portion 72 in the circumferential groove 12 of the inner ring 1 and by fitting an outer peripheral portion of the seal portion 72 in the seal attachment groove 22 of the outer ring 2 in an elastically deformed state. Specifically, the first seal 7 is fixed to the outer ring 2.

As illustrated in FIG. 7, the second seal 7A is an ordinary seal composed of a core metal 71A and a rubber-made seal portion 72. The second seal 7A is disposed between the inner ring 1 and outer ring 2 by disposing an inner peripheral portion of the seal portion 72 in the circumferential groove 12 of the inner ring 1 and by fitting an outer peripheral portion of the seal portion 72 in the seal attachment groove 22 of the outer ring 2 in an elastically deformed state. Specifically, the second seal 7A is fixed to the outer ring 2.

Figure 11:
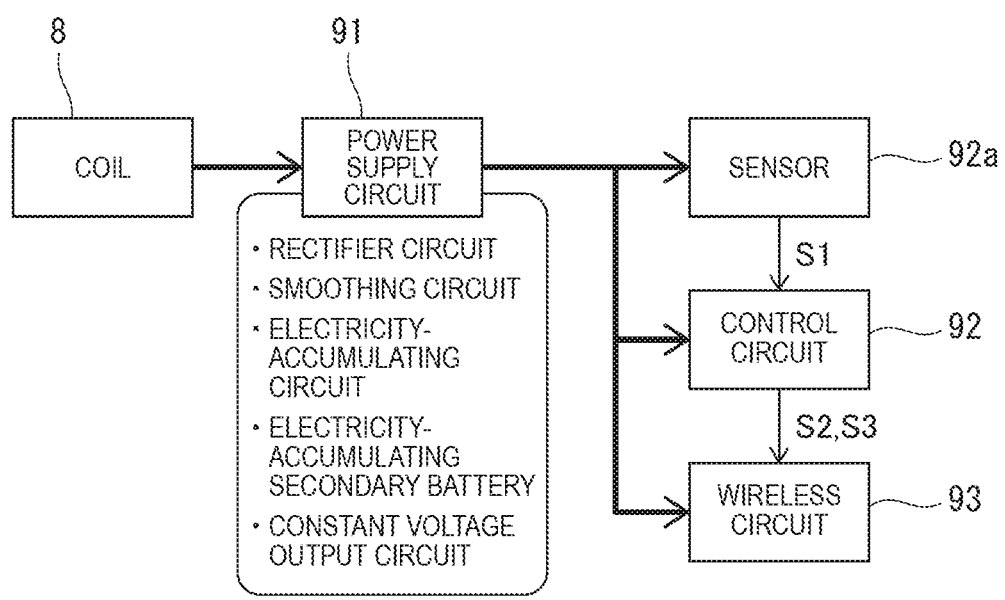
FIG. 11 is a diagram illustrating a circuit configuration which the wireless sensor-equipped bearing of the fourth embodiment includes.

As illustrated in FIG. 9B and FIG. 11, the circuit board (circuit unit) 9 includes a power supply circuit 91, a control circuit 92, a wireless circuit 93 and an antenna 94. At least one sensor 92a, which is among an acceleration sensor, a temperature sensor, a rotation sensor and a load sensor, is provided on the control circuit 92. The power supply circuit 91 rectifies and smooths a current occurring in the coils 8 by electromagnetic induction, supplies the resultant current to power-supplied units (sensor 92a, control circuit 92 and wireless circuit 93), and accumulates the current. For this purpose, the power supply circuit 91 includes a rectifier circuit, a smoothing circuit, an electricity-accumulating circuit, an electricity-accumulating secondary battery and a constant voltage output circuit.

The control circuit (arithmetic circuit) 92 calculates information S1 which is detected by the sensor 92a, and outputs to the wireless circuit 93 a signal S2 indicative of the calculation result and a control signal S3 indicative of a transmission cycle of the calculation result. The wireless circuit 93 converts signal S2 indicative of the calculation result from the control circuit 92 to a wireless signal at a transmission cycle corresponding to the control signal S3, and outputs the wireless signal to the antenna 94. The antenna 94 wirelessly transmits a wireless signal indicative of the calculation result (information detected by the sensor 92a) to a receiving terminal provided on the outside at predetermined cycles.

Figure 10:
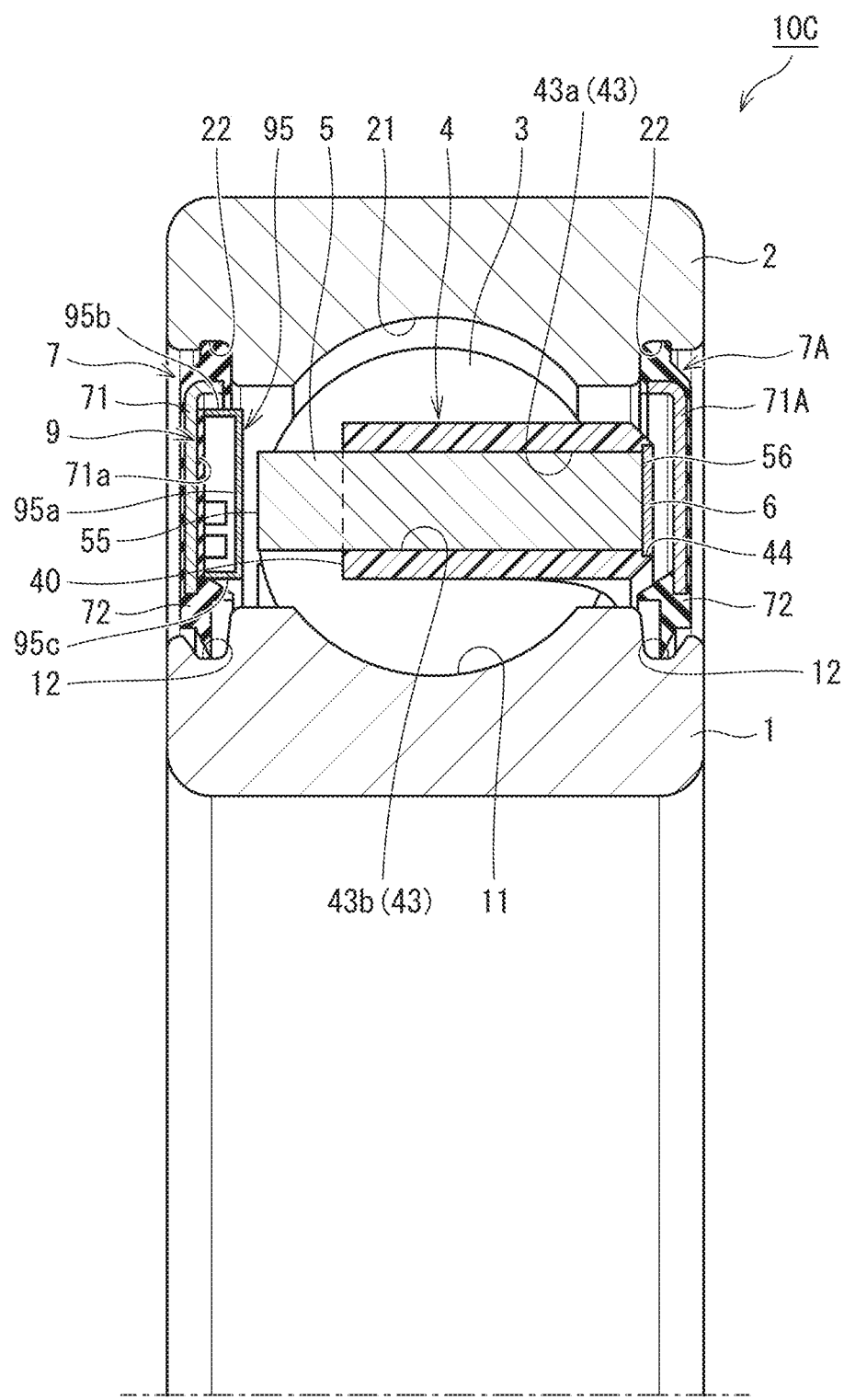
FIG. 10 is a cross-sectional view illustrating the wireless sensor-equipped bearing of the fourth embodiment, FIG. 10 being a view corresponding to a B-B cross section in FIG. 9B.

As illustrated in FIG. 9B and FIG. 10, a range of the circuit board 9, from which the antenna 94 is excluded, is covered with a magnetic shield 95. The magnetic shield 95 is a part formed of a metal with a high magnetic permeability (for example, iron, permalloy, or silicon steel) or a synthetic resin containing particles of a metal with a high magnetic permeability. As illustrated in FIG. 10, the magnetic shield 95 has such a shape that a bottom plate 95a, an outer peripheral wall 95b and an inner peripheral wall 95c are integrally formed. The bottom plate 95a of the magnetic shield 95 and the axial one-end face 55 of the magnet 5 are opposed to each other.

As illustrated in FIG. 9B, the bottom plate 95a has a plan-view shape defined by an arc which is concentric with the core metal 71 of the first seal 7 and has a diameter slightly greater than the inner periphery of the core metal 71, an arc which is concentric with the core metal 71 and has a diameter slightly less than the outer periphery of the core metal 71, and two straight lines extending in the radial direction of the core metal 71 and connecting these arcs.

Projecting parts of the circuit board 9 are disposed in the inside of the magnetic shield 95 (the space surrounded by the bottom plate 95a, outer peripheral wall 95b and inner peripheral wall 95c). The magnetic shield 95 is fixed to the circuit board 9 by any one of methods of screwing, soldering, adhesion and engagement.

As described above, although the plural coils 8 and one circuit board 9 are fixed to the inside surface 71a of the core metal 71 of the first seal 7 and that part of the circuit board 9, which excludes the antenna 94, covered with the magnetic shield 95, it is preferable to further cover these parts with a protection cover. Thereby, the coils 8, antenna 94 and magnetic shield 95 can be prevented from being contaminated by grease filled in the inside of the bearing and by abrasion powder occurring at a time of use.

The wireless sensor-equipped bearing 10C of this embodiment is used in a state in which the outer ring 2 is fixed to a housing and a shaft is engaged in the inner ring 1. If the shaft is rotated in this state, the inner ring 1 rotates together with the retainer 4, and the first seal 7 fixed to the outer ring 2 does not rotate (i.e. the first seal 7 and retainer 4 rotate relative to each other). Thus, relative rotation occurs between the coils 8 fixed to the first seal 7 and the magnets 5 fixed to the retainer 4.

Accordingly, electromagnetic induction occurs by a magnetic flux density variation due to the relative rotation between the coils 8 and magnets 5. An electric current generated in the coils 8 by the electromagnetic induction is rectified and smoothed by the power supply circuit 91, and the current is supplied to power-supplied units (sensor 92a, control circuit 92 and wireless circuit 93) and accumulated in the secondary battery.

By the supplied current, the sensor 92a, control circuit 92 and wireless circuit 93 are driven. The control circuit 92 calculates the information S1 detected by the sensor 92a, and the signal S2 indicative of the calculation result and the control signal S3 indicative of the transmission cycle of the calculation result are output to the wireless circuit 93. In conjunction with this, in the wireless circuit 93, the signal S2 indicative of the calculation result from the control circuit 92 is converted to a wireless signal at a transmission cycle corresponding to the control signal S3, and the wireless signal is output to the antenna 94. As a result, from the antenna 94, a signal indicative of the information detected by the sensor 92a is wirelessly transmitted to a receiving terminal provided on the outside at predetermined cycles.

According to the wireless sensor-equipped bearing 10C of this embodiment, the range of the circuit board 9, from which the antenna 94 is excluded, is covered with the magnetic shield 95. Thus, the influence of the magnetic flux density variation due to the relative rotation between the coils 8 and magnets 5, which is exerted on the power supply circuit 91, sensor 92a, control circuit 92 and wireless circuit 93, is suppressed. As a result, noise due to induction current is prevented from occurring in the power supply circuit 91, sensor 92a, control circuit 92 and wireless circuit 93.

Additionally, the wireless sensor-equipped bearing 10C of this embodiment requires no new processing on the inner ring 1 and outer ring 2 of the conventional rolling bearing. In addition, the wireless sensor-equipped bearing 10C can easily be obtained by replacing one of two second seals 7A, which are used in the conventional rolling bearing, with the first seal 7 on which the coils 8 and circuit board 9 are fixed, and by replacing a crown retainer used in the conventional rolling bearing with the retainer 4 having the magnets 5.

Besides, the wireless sensor-equipped bearing 10C of this embodiment performs power generation by electromagnetic induction between the coils 8 and magnets 5. Thus, even at an initial time of use when vibration is small or at a low-speed rotation time, necessary electric power can be obtained and a sensor function can be exhibited. Power generation at such times was difficult in the wireless sensor-equipped bearing which performs power generation by using a Seebeck element that is a thermoelectric power generating element, or an electret element that is a vibration power generating element.

Additionally, the coils 8 and circuit board 9 are fixed to the first seal 7, the through-holes 43 are provided in the columnar portions 42 of the retainer 4, and the magnets 5 disposed in the through-holes 43 are made to project toward the first seal 7 side. Therefore, compared to the conventional rolling bearing, a decrease of the inside space of the bearing is small.

Additionally, by virtue of the structure in which most parts of the magnets 5 are buried in the retainer 4, it is possible to use magnets with great perpendicular field variations to the coils 8. As a result, compared to the structure in which the amount of burying of magnets is small, the power generation efficiency is enhanced.

Additionally, in the wireless sensor-equipped bearing 10C of this embodiment, the circuit board 9 is configured such that the antenna 94 wirelessly transmits the signal indicative of the calculation result to the receiving terminal provided on the outside at predetermined cycles. Thereby, the wireless circuit 93 and antenna 94 operate only at a time of calculation and at a time of wireless transmission. Therefore, compared to the structure in which the wireless circuit 93 and antenna 94 operate at all times, the power consumption can be reduced.

In the wireless sensor-equipped bearing 10C of this embodiment, the antenna 94 is formed on a component mounting surface of the circuit board 9. However, it is possible to form an antenna on a surface of the circuit board 9 opposite to the component mounting surface, and to project the antenna to the outside of the bearing from the first seal 7 by providing a hole in the core metal 71 and seal portion 72. In this case, the component mounting surface of the circuit board 9 is covered with the magnetic shield, and the antenna does not need to be covered with the magnetic shield.

Additionally, in the wireless sensor-equipped bearing 10C of this embodiment, the power supply circuit 91, control circuit 92, wireless circuit 93 and antenna 94 are formed on the single circuit board 9, and this circuit board 9 is fixed to the core metal 71. However, the power supply circuit 91, control circuit 92, wireless circuit 93 and antenna 94 may be formed on different boards. In this case, it is preferable that all circuits and the wiring lines connecting these circuits are covered with the magnetic shield 95. Moreover, the power supply circuit 91, control circuit 92, wireless circuit 93 and antenna 94 may be directly formed on an insulation film formed on the inside surface 71a of the core metal 71.

Additionally, in the wireless sensor-equipped bearing 10C of this embodiment, the range of the circuit board 9, from which the antenna 94 is excluded, is covered with the magnetic shield 95. However, according to a wireless sensor-equipped bearing of a first aspect of this invention, it should suffice if at least the wireless circuit 93 of the circuit board 9 is covered with the magnetic shield 95.

Additionally, in the wireless sensor-equipped bearing 10C of this embodiment, since the sensor 92a is formed on the control circuit 92 (i.e. on the core metal 71 of the first seal 7), no new processing is needed on the inner ring 1 and outer ring 2 which constitute the conventional rolling bearing, and no projecting portion exists on the outside.

However, the sensor 92a may be fixed to at least any one of the axial end face, outer peripheral surface and inner peripheral surface of the outer ring 2 to which the first seal 7 is fixed. When the first seal 7 is fixed to the inner ring 1, the sensor 92a may be fixed to at least any one of the axial end face, outer Peripheral surface and inner peripheral surface of the inner ring 1. Besides, a recess portion for fixing the sensor 92a may be provided in any one of these faces and surfaces.

Additionally, in the wireless sensor-equipped bearing 10C of this embodiment, although neodymium magnets are used as the magnets 5, other magnets such as samarium-cobalt magnets may be used.

Additionally, in the wireless sensor-equipped bearing 10C of this embodiment, the magnet 5 projects from the axial one-end face 40 of the retainer 4. However, the axial one-end face 55 of the magnet 5 may be flush with the axial one-end face 40 of the retainer 4 or may be positioned inside the axial one-end face 40 of the retainer 4. Furthermore, the axial one-end face 55 of the magnet 5 may be positioned inside the axial one-end face 40 of the retainer 4, and when the retainer 4 is fabricated by injection molding of synthetic resin, the magnet 5 may be integrally formed such that the axial one-end face 55 is thinly covered with the synthetic resin.

Specifically, it should suffice if the plural magnets 5 are fixed such that the N pole and S pole of the magnets neighbor in the circumferential direction of the retainer 4 that is the annular body, and the magnets 5 are in a state in which electromagnetic induction occurs between the coils 8 and the magnets 5. In a case in which the axial one-end face 55 of the magnet 5 is covered with synthetic resin, the magnet 5 is opposed to the coil 8 via a coating portion of the synthetic resin.

Fifth Embodiment

Figure 12:
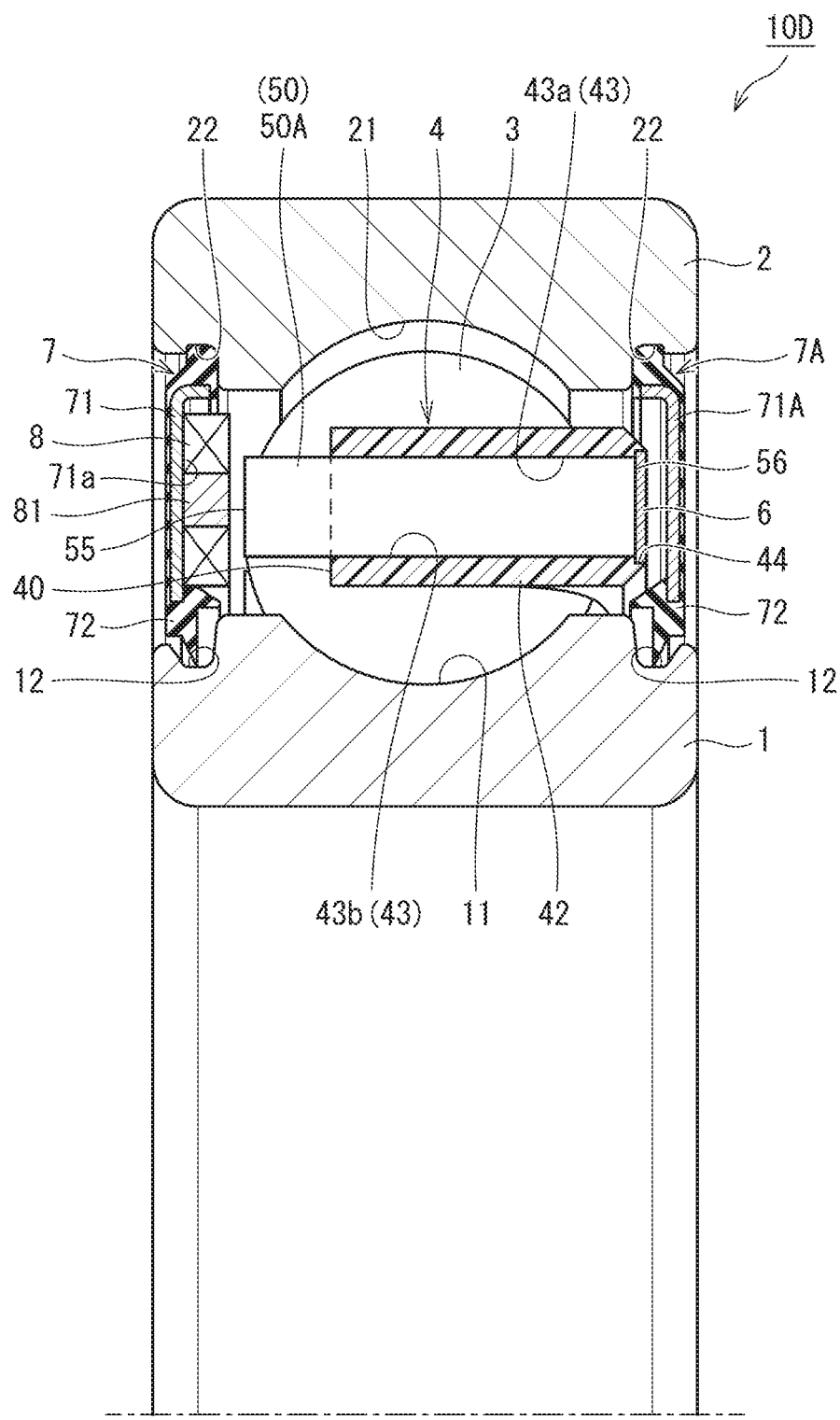
FIG. 12 is a cross-sectional view illustrating a wireless sensor-equipped bearing according to a fifth embodiment.

As illustrated in FIG. 12 and FIG. 13, a wireless sensor-equipped bearing 10D according to this embodiment includes an inner ring 1, an outer ring 2, balls (rolling elements) 3, a retainer 4, 16 (a plurality of) magnets 50A and 50B, a yoke 6, a first seal 7 and a second seal 7A.

An inner ring raceway surface 11 is formed on an axial middle portion of an outer peripheral surface of the inner ring 1. Circumferential grooves 12 for disposing the seals are formed at both axial end portions of the outer peripheral surface of the inner ring 1. An outer ring raceway surface 21 is formed on an axial middle portion of an inner peripheral surface of the outer ring 2. Seal attachment grooves 22 are formed at both axial end portions of the inner peripheral surface of the outer ring 2. The inner ring raceway surface 11 and outer ring raceway surface 21 are disposed to be opposed to each other. The balls 3 are disposed in a raceway formed by the inner ring raceway surface 11 and outer ring raceway surface 21.

As illustrated in FIG. 13, the retainer 4 is formed of an annular body and includes pockets 41 which rotatably hold the balls 3. The pockets 41 penetrate the peripheral surface of the retainer 4. An axial one-end face 40 of the retainer 4 is opened at the pockets 41. In short, the retainer 4 is a crown retainer. Eight (a plurality of) pockets 41 are formed in the circumferential direction of the retainer 4. Through-holes 43, which extend in the axial direction, are formed in portions (columnar portions) 42 between neighboring pockets 41 of the retainer 4.

The inner surfaces of the through-hole 43 include a large-diameter surface 43*a* on the outer peripheral side of the retainer 4, a small-diameter surface 43*b* on the inner peripheral side, and a pair of opposed faces 43*c* and 43*d* extending along the radial direction of the retainer 4. Through-holes 43 are formed one by one in all columnar portions 42. An annular recess portion 44, which is recessed in the axial direction, is formed in an axial other-end face of the retainer 4.

One magnet pair 50, in which two magnets 50A and 50B are attached, is disposed in each of all through-holes (between neighboring pockets) 43 of the retainer 4. The magnets 50A and 50B are neodymium magnets of the same shape. In the magnet pair 50, the magnets 50A and 50B are attached such that the N pole and S pole neighbor each other. Specifically, 16 (plural) magnets 50A and 50B are arranged such that every two (an even number of) magnets 50A and 50B are disposed in each of all through-holes 43 and such that the N pole and S pole of each magnet 50A, 50B are arranged in the axial direction of the retainer 4 and the N pole and S pole of the magnets 50A and 50B neighbor in the circumferential direction of the retainer 4.

The magnets 50A and 50B have such a shape as to correspond to the inner surfaces of the through-hole 43 of the retainer 4 in the state in which the magnets 50A and 50B are attached and combined into the magnet pair 50. The magnet pair 50 has an outer surface 51 corresponding to the large-diameter surface 43*a* of the through-hole 43, an inner surface 52 corresponding to the small-diameter surface 43*b* of the through-hole 43, outer faces 53 and 54 corresponding to the pair of opposed faces 43*c* and 43*d* of the through-hole 43, an axial one-end face 55 on the axial one-end face 40 side of the retainer 4, and an axial other-end face 56 which is opposite to the axial one-end face 55.

Figure 14B:
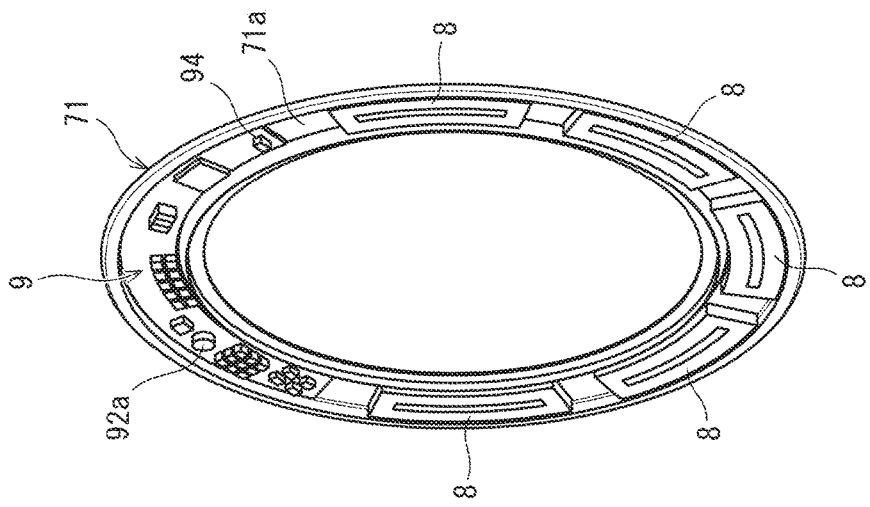
FIG. 14B is a perspective view illustrating a core metal of the first seal.
Figure 14A:
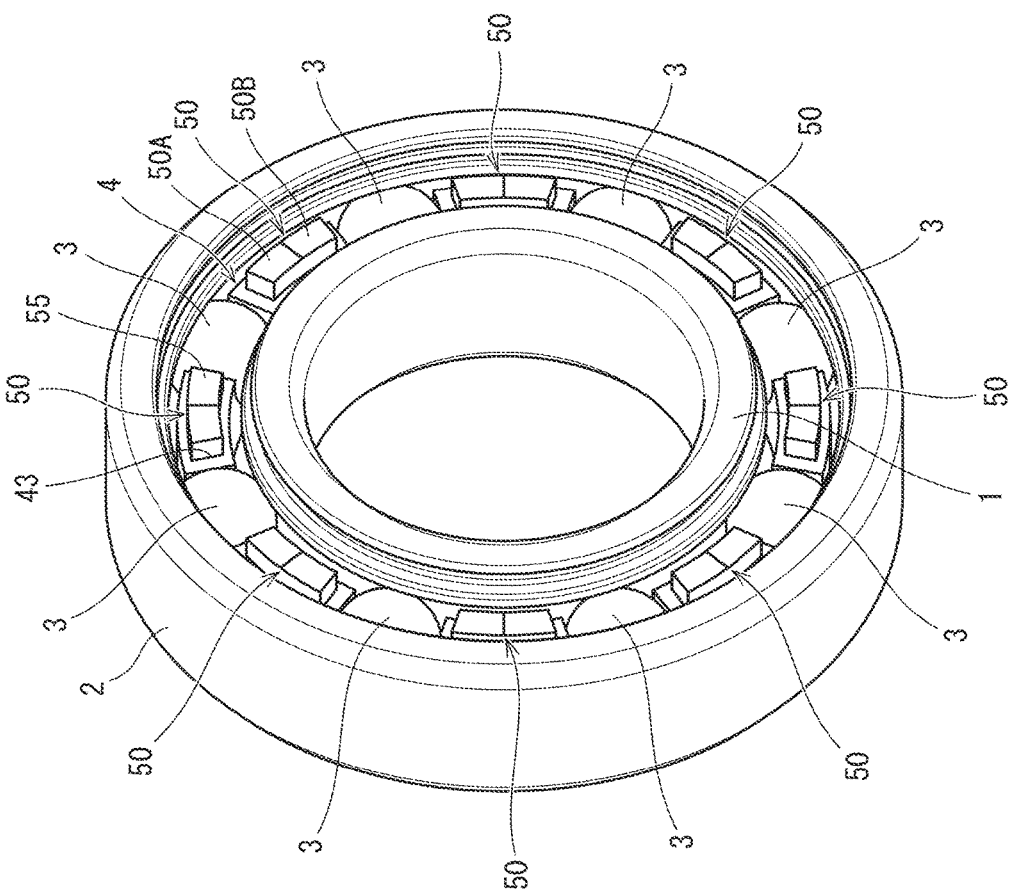
FIG. 14A is a perspective view illustrating a state in which a first seal is removed from the wireless sensor-equipped bearing of the fifth embodiment.

A distance (a dimension in the axial direction) between the axial one-end face 55 and axial other-end face 56 of the magnet pair 50 is greater than an axial dimension of the retainer 4. Thus, as illustrated in FIG. 12 and FIG. 14A, the magnet pair 50 disposed in the through-hole 43 projects from the axial one-end face 40 of the retainer 4.

As illustrated in FIG. 13, the yoke 6 is an annular metal plate and has such a dimension as to fit in the recess portion 44 of the retainer 4. As illustrated in FIG. 12, the yoke 6 is fitted in the recess portion 44, and is put in contact with the axial other-end face 56 of the magnet pair 50 disposed in the through-hole 43. The yoke 6 is formed of a material with a high relative magnetic permeability such as electrical steel.

In order to prevent degradation of the magnet pairs 50 and yoke 6, it is preferable to cover the surfaces of the magnet pairs 50 and yoke 6 with a fluoro-rubber coating film or an evaporation-deposited film of parylene (common name of "polyparaxylene"). The retainer 4 is formed of a nonmagnetic material such as 6, 6-nylon. When the retainer 4 is fabricated by injection molding, it is preferable that the magnet pairs 50 and yoke 6 are disposed in a mold and formed as one piece. The magnet pairs 50 may be put and adhered in the through-holes 43 of the injection-molded retainer 4, and the yoke 6 may be fitted and adhered in the recess portion 44.

As illustrated in FIG. 12, the first seal 7 is composed of a core metal 71 and a rubber-made seal portion 72. As illustrated in FIG. 12 and FIG. 14B, a plurality of coils 8 and one circuit board 9 are fixed to an inside surface (a surface opposed to the magnet pairs 50) 71*a* of the core metal 71 of the first seal 7. The core metal 71 is formed of a material with a high relative magnetic permeability such as electrical steel. An insulation film is formed on the inside surface 71*a* of the core metal 71.

A core metal 81 of the coil 8 is formed of a material with a high relative magnetic permeability such as electrical steel. In order to improve a power generation amount by electromagnetic induction caused by the relative rotation between the coil 8 and magnet pair 50, use may be made of the coil 8 in which thin-film coils are stacked, or the coil 8 in which a metal wire with a diameter of 0.01 mm or less is wound.

As illustrated in FIG. 12, the first seal 7 is disposed between the inner ring 1 and outer ring 2 by disposing an inner peripheral portion of the seal portion 72 in the circumferential groove 12 of the inner ring 1 and by fitting an outer peripheral portion of the seal portion 72 in the seal attachment groove 22 of the outer ring 2 in an elastically deformed state. Specifically, the first seal 7 is fixed to the outer ring 2.

As illustrated in FIG. 12, the second seal 7A is an ordinary seal composed of a core metal 71A and a rubber-made seal portion 72. The second seal 7A is disposed between the inner ring 1 and outer ring 2 by disposing an inner peripheral portion of the seal portion 72 in the circumferential groove 12 of the inner ring 1 and by fitting an outer peripheral portion of the seal portion 72 in the seal attachment groove 22 of the outer ring 2 in an elastically deformed state. Specifically, the second seal 7A is fixed to the outer ring 2.

Figure 15:
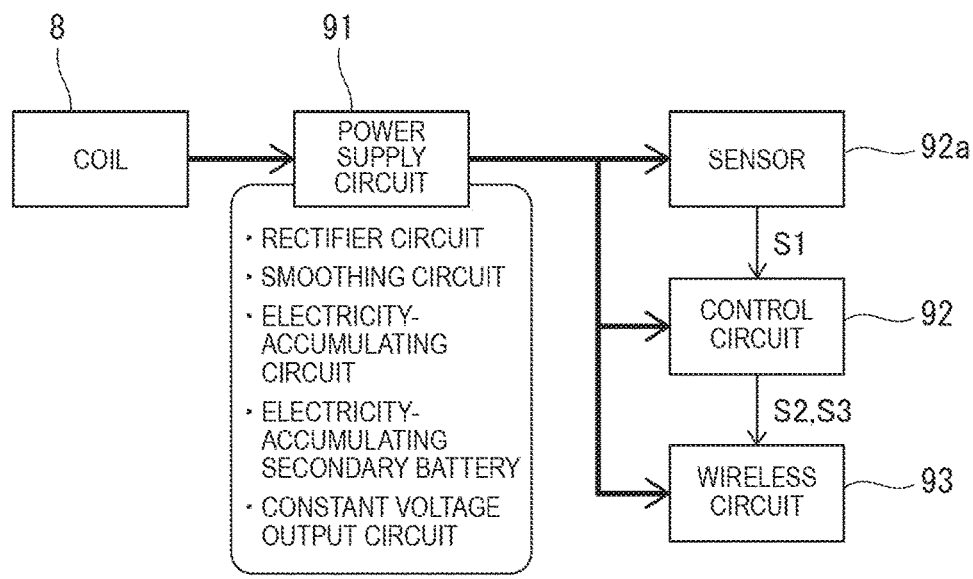
FIG. 15 is a diagram illustrating a circuit configuration which the wireless sensor-equipped bearing of the fifth embodiment includes.

As illustrated in FIG. 14B and FIG. 15, the circuit board (circuit unit) 9 includes a power supply circuit 91, a control circuit 92, a wireless circuit 93 and an antenna 94. At least one sensor 92*a*, which is among an acceleration sensor, a temperature sensor, a rotation sensor and a load sensor, is provided on the control circuit 92. The power supply circuit 91 rectifies and smooths a current occurring in the coils 8 by electromagnetic induction, supplies the resultant current to power-supplied units (sensor 92*a*, control circuit 92 and wireless circuit 93), and accumulates the current. For this purpose, the power supply circuit 91 includes a rectifier circuit, a smoothing circuit, an electricity-accumulating circuit, an electricity-accumulating secondary battery and a constant voltage output circuit.

The control circuit (arithmetic circuit) 92 calculates information S1 which is detected by the sensor 92*a*, and outputs to the wireless circuit 93 a signal S2 indicative of the calculation result and a control signal S3 indicative of a transmission cycle of the calculation result. The wireless circuit 93 converts the signal S2 indicative of the calculation result from the control circuit 92 to a wireless signal at a transmission cycle corresponding to the control signal S3, and outputs the wireless signal to the antenna 94. The antenna 94 wirelessly transmits a wireless signal indicative of the calculation result (information detected by the sensor 92*a*) to a receiving terminal provided on the outside at predetermined cycles.

As described above, although the plural coils 8 and one circuit board 9 are fixed to the inside surface 71*a* of the core metal 71 of the first seal 7, it is preferable to further cover these parts with a protection cover. Thereby, the coils 8, circuit board 9 and antenna 94 can be prevented from being contaminated by grease filled in the inside of the bearing and by abrasion powder occurring at a time of use.

The wireless sensor-equipped bearing 10D of this embodiment is used in a state in which the outer ring 2 is fixed to a housing and a shaft is engaged in the inner ring 1. If the shaft is rotated in this state, the inner ring 1 rotates together with the retainer 4, and the first seal 7 fixed to the outer ring 2 does not rotate (i.e. the first seal 7 and retainer 4 rotate relative to each other). Thus, relative rotation occurs between the coils 8 fixed to the first seal 7 and the magnet pairs 50 fixed to the retainer 4.

Accordingly, electromagnetic induction occurs by a magnetic flux density variation due to the relative rotation between the coils 8 and magnet pairs 50. An electric current generated in the coils 8 by the electromagnetic induction is rectified and smoothed by the power supply circuit 91, and the current is supplied to the power-supplied units (sensor 92a, control circuit 92 and wireless circuit 93) and accumulated in the secondary battery.

By the supplied current, the sensor 92a, control circuit 92 and wireless circuit 93 are driven. The control circuit 92 calculates the information S1 detected by the sensor 92a, and the signal S2 indicative of the calculation result and the control signal S3 indicative of the transmission cycle of the calculation result are output to the wireless circuit 93. In conjunction with this, in the wireless circuit 93, the signal S2 indicative of the calculation result from the control circuit 92 is converted to a wireless signal at a transmission cycle corresponding to the control signal S3, and the wireless signal is output to the antenna 94. As a result, from the antenna 94, a signal indicative of the information detected by the sensor 92a is wirelessly transmitted to a receiving terminal provided on the outside at predetermined cycles.

The wireless sensor-equipped bearing 10D of this embodiment requires no new processing on the inner ring 1 and outer ring 2 of the conventional rolling bearing. In addition, the wireless sensor-equipped bearing 10D can easily be obtained by replacing one of two second seals 7A, which are used in the conventional rolling bearing, with the first seal 7 on which the coils 8 and circuit board 9 are fixed, and by replacing a crown retainer used in the conventional rolling bearing with the retainer 4 having the magnet pairs 50.

Besides, the wireless sensor-equipped bearing 10D of this embodiment performs power generation by electromagnetic induction between the coils 8 and magnet pairs 50. Thus, even at an initial time of use when vibration is small or at a low-speed rotation time, necessary electric power can be obtained and a sensor function can be exhibited. Power generation at such times was difficult in the wireless sensor-equipped bearing which performs power generation by using a Seebeck element that is a thermoelectric power generating element, or an electret element that is a vibration power generating element.

Additionally, the coils 8 and circuit board 9 are fixed to the first seal 7, the through-holes 43 are provided in the columnar portions 42 of the retainer 4, and the magnet pairs 50 disposed in the through-holes 43 are made to project toward the first seal 7 side. Therefore, compared to the conventional rolling bearing, a decrease of the inside space of the bearing is small.

Additionally, by virtue of the structure in which most parts of the magnet pairs 50 are buried in the retainer 4, it is possible to use magnets with great perpendicular field variations to the coils S. As a result, compared to the structure in which the amount of burying of magnets is small, the power generation efficiency is enhanced.

Additionally, in the wireless sensor-equipped bearing 10D of this embodiment, the circuit board 9 is configured such that the antenna 94 wirelessly transmits the signal indicative of the calculation result to the receiving terminal provided on the outside at predetermined cycles. Thereby, the wireless circuit 93 and antenna 94 operate only at a time of calculation and at a time of wireless transmission. Therefore, compared to the structure in which the wireless circuit 93 and antenna 94 operate at all times, the power consumption can be reduced.

In the wireless sensor-equipped bearing 10D of this embodiment, the antenna 94 is formed on a component mounting surface of the circuit board 9. However, it is possible to form an antenna on a surface of the circuit board 9 opposite to the component mounting surface, and to project the antenna to the outside of the bearing from the first seal 7 by providing a hole in the core metal 71 and seal portion 72.

Additionally, in the wireless sensor-equipped bearing 10D of this embodiment, the annular yoke 6 is disposed in the recess portion 44 provided in the axial other-end face of the retainer 4. However, it is possible to use, without providing the recess portion 44, a yoke having the same plan-view shape as the axial other-end face of the through-hole 43, and to dispose the yoke on the axial other-end face of each through-hole 43.

Additionally, in the wireless sensor-equipped bearing 10D of this embodiment, the power supply circuit 91, control circuit 92, wireless circuit 93 and antenna 94 are formed on the single circuit board 9, and this circuit board 9 is fixed to the core metal 71. However, the power supply circuit 91, control circuit 92, wireless circuit 93 and antenna 94 may be formed on different boards. Moreover, the power supply circuit 91, control circuit 92, wireless circuit 93 and antenna 94 may be directly formed on an insulation film formed on the inside surface 71a of the core metal 71.

Additionally, in the wireless sensor-equipped bearing 10D of this embodiment, since the sensor is formed on the control circuit 92 (i.e. on the core metal 71 of the first seal 7), no new processing is needed on the inner ring 1 and outer ring 2 which constitute the conventional rolling bearing, and no projecting portion exists on the outside.

However, the sensor may be fixed to at least any one of the axial end face, outer peripheral surface and inner peripheral surface of the outer ring 2 to which the first seal 7 is fixed. When the first seal 7 is fixed to the inner ring, the sensor may be fixed to at least any one of the axial end face, outer peripheral surface and inner peripheral surface of the inner ring. Besides, a recess portion for fixing the sensor may be provided in any one of these faces and surfaces.

Additionally, in the wireless sensor-equipped bearing 10D of this embodiment, although neodymium magnets are used as the magnets 50A and 50B, other magnets such as samarium-cobalt magnets may be used.

Additionally, in the wireless sensor-equipped bearing 10D of this embodiment, the magnet pair 50 projects from the axial one-end face 40 of the retainer 4. However, the axial one-end face 55 of the magnet pair 50 may be flush with the axial one-end face 40 of the retainer 4 or may be positioned inside the axial one-end face 40 of the retainer 4. Furthermore, the axial one-end face 55 of the magnet pair 50 may be positioned inside the axial one-end face 40 of the retainer 4, and when the retainer 4 is fabricated by injection molding of synthetic resin, the magnet pair 50 may be integrally formed such that the axial one-end face 55 is thinly covered with the synthetic resin. Specifically, it should suffice if the state in which electromagnetic induction occurs between the coils 8 and magnetic pairs 50 is ensured.

In a case in which the axial one-end face 55 of the magnet pair 50 is covered with synthetic resin, the magnet pair 50 is opposed to the coil 8 via a coating portion of the synthetic resin.

Additionally, in this embodiment, the magnet pair 50, in which the magnets 50A and 50B are attached, is disposed in the through-hole 43. However, the magnets 50A and 50B may not be attached and may be disposed in the through-hole 43. Besides, when the magnets 50A and 50B are attached, if a magnetic material with a high magnetic permeability, such as silicon steel or iron, is interposed, the efficiency of utilization of the magnetic flux occurring between the coil 8 and magnetic pair 50 can be enhanced.

Additionally, the number of magnets, which are fixed between the pockets 41 of the retainer 4, is not limited to two. The number of magnets, which are fixed between the pockets 41, may be three or more if the number is plural.

<Advantages of the Even Number of Magnets being Fixed Between the Pockets of the Retainer>

Figure 16A:
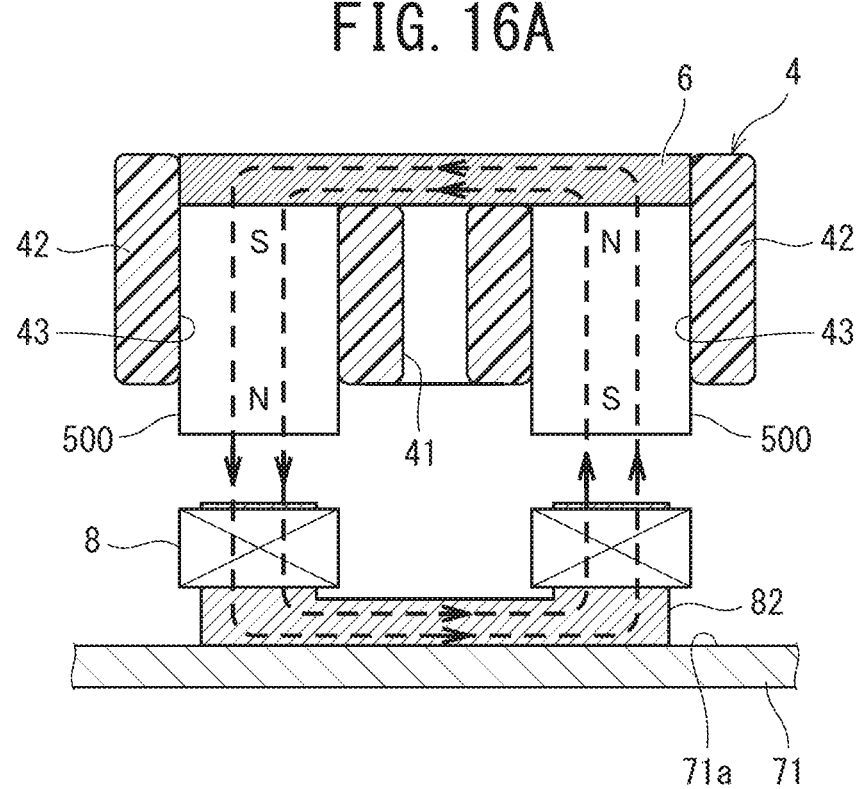
FIGS. 16A and 16B are views for describing, by comparison, a case of FIG. 16A in which magnets are disposed one by one between pockets of the retainer, and a case of FIG. 16B in which magnets are disposed two by two between pockets of the retainer.
Figure 16B:
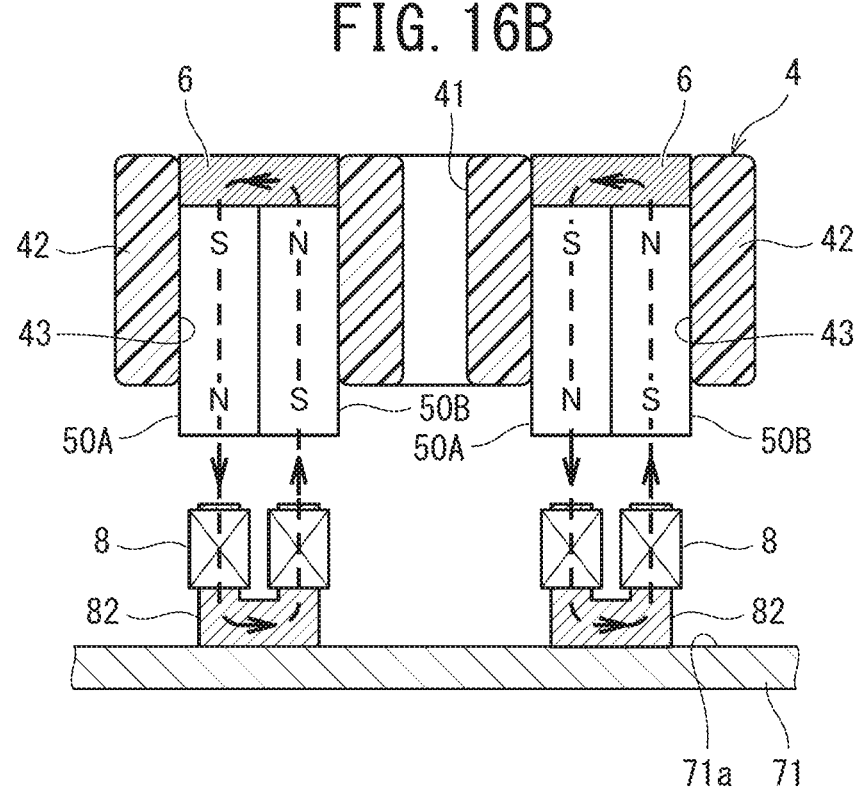

Referring to FIG. 16, a description is given of a case of FIG. 16A in which one magnet is disposed in each of the through-holes 43 of the columnar portions (portions between pockets 41) 42 of the retainer 4, and a case of FIG. 16B in which two magnets are disposed in each of the through-holes 43, as in the case of the wireless sensor-equipped bearing 10D of the fifth embodiment. FIG. 16A illustrates an example in which the yoke 6 is disposed over two neighboring through-holes 43. FIG. 16B illustrates an example in which one yoke 6 is disposed in each through-hole 43.

In each of the examples, a yoke 82 of the coil 8 is fixed to the inside surface 71a of the core metal 71 of the first seal 7 via an insulation film. This insulation film may not be provided, and the coil 8 may be directly fixed on the inside surface 71a, with the core metal 71 being used as the yoke of the coil 8.

In the case of FIG. 16A, a magnetic circuit is formed between two magnets 500 disposed in two neighboring through-holes 43, the yoke 6 that is in contact with the two magnets 500, the coil 8 opposed to the two magnets 500, and the yoke 82 of the coil 8. In the case of FIG. 16B, a magnetic circuit is formed between two magnets 50A and 50B disposed in one through-hole 43, the yoke 6 that is in contact with the two magnets 50A and 50B, the coil 8 opposed to the two magnets 50A and 50B, and the yoke 82 of the coil 8.

Specifically, in the case of FIG. 16A, the magnetic circuit is formed, with the two magnets 500 disposed in two through-holes 43 being used as one unit. On the other hand, in the case (b), the magnetic circuit is formed, with the two magnets 50A and 50B disposed in one through-hole 43 being used as one unit. Accordingly, in the case (b), as compared to the case of FIG. 16A, double the number of magnetic circuits are formed as a whole in the wireless sensor-equipped bearing.

The case of FIG. 16A and case of 16B have advantages and disadvantages. The advantage of the case of 16A is that large magnets can be used since one magnet 500 is disposed in one through-hole 43. The power generation amount by one magnetic circuit becomes greater than in the case of FIG. 16B. The disadvantage of the case of 16A is that since the magnetic circuit is larger and the magnetic path is longer than in the case of FIG. 16B, the magnetic resistance is greater than in the case of FIG. 16B and the power generation efficiency is lower than in the case of FIG. 16B. In other words, the advantage of the case FIG. 16B is that since the magnetic circuit is smaller and the magnetic path is shorter than in the case of FIG. 16A, the magnetic resistance is less than in the case of FIG. 16A and the power generation efficiency is higher than in the case of FIG. 16A.

Furthermore, in the case of FIG. 16A, the magnet pair that is composed of two magnets 50A and 50B is disposed in the through-hole 43 of one columnar portion (portion between pockets) 42. Thus, even when the number of pockets 41 is odd, a magnetic circuit can efficiently be formed by disposing magnet pairs in all columnar portions 42. By contrast, if the case of FIG. 16A is adopted when the number of pockets 41 is odd, the magnet 500 cannot be disposed in one columnar portion 42, and the efficiency of formation of the magnetic circuit becomes lower than in the case of FIG. 16B.

Thus, according to the wireless sensor-equipped bearing 10D of this embodiment, even when the bearing does not rotate once or more, for example, even when the bearing repeats a swinging movement in a predetermined angular range, power generation is enabled. Therefore, the wireless sensor-equipped bearing 10D of this embodiment can exhibit the power generation function even when this wireless sensor-equipped bearing 10D is applied to a robot arm, a servo motor, etc.

REFERENCE SIGNS LIST

1 . . . Inner ring
11 . . . Inner ring raceway surface
12 . . . Circumferential groove for disposition of seal
2 . . . Outer ring
21 . . . Outer ring raceway surface
22 . . . Seal attachment grooves
3 . . . Ball (rolling element)
4 . . . Retainer
4A . . . Retainer
4B . . . Retainer
41 . . . Pocket
40 . . . Axial one-end face of retainer
42 . . . Columnar portion (portion between pockets)
43 . . . Through-hole
44 . . . Recess portion of retainer
5 . . . Magnet
5A . . . Magnet
5B . . . Magnet
50 . . . Magnet pair
50A . . . Magnet
50B . . . Magnet
55 . . . Axial one-end face (face opposed to coil) of magnet
500 . . . Magnet
6 . . . Yoke
7 . . . First seal
71 . . . Core metal of first seal
71a . . . Inside surface (surface opposed to magnet) of first seal
72 . . . Seal portion
7A . . . Second seal
71A . . . Core metal of second seal
8 . . . Coil
9 . . . Circuit board (circuit unit)
91 . . . Power supply circuit
92 . . . Control circuit (arithmetic circuit, power-supplied unit)
92a . . . Sensor (power-supplied unit)
93 . . . Wireless circuit (power-supplied unit)
94 . . . Antenna
95 . . . Magnetic shield
10 . . . Wireless sensor-equipped bearing
10A . . . Wireless sensor-equipped bearing
10B . . . Wireless sensor-equipped bearing
10C . . . Wireless sensor-equipped bearing
10D . . . Wireless sensor-equipped bearing

The invention claimed is:

1. A wireless sensor-equipped bearing comprising:
an inner ring having an inner ring raceway surface on an outer peripheral surface of the inner ring;
an outer ring having, on an inner peripheral surface of the outer ring, an outer ring raceway surface disposed to be opposed to the inner ring raceway surface;
a rolling element disposed in a raceway formed by the inner ring raceway surface and the outer ring raceway surface;
a retainer formed of an annular body, the retainer including a pocket configured to rotatably hold the rolling element, the pocket penetrating a peripheral surface of the annular body, a plurality of the pockets being formed in a circumferential direction of the annular body and through-holes extending in axial direction are formed in portions between neighboring the pockets;
a plurality of magnets fixed in the through-holes of the retainer such that an N pole and an S pole of the magnets neighbor in the circumferential direction of the annular body;
a first seal configured to effect sealing between the inner ring and the outer ring at an axial one-end portion, the first seal being configured to rotate relative to the retainer;
a coil fixed to a surface of the first seal, the surface of the first seal being opposed to the magnet;
a second seal configured to effect sealing between the inner ring and the outer ring at an axial other-end portion;
a sensor disposed on any one of the inner ring, the outer ring and the first seal;
a circuit unit formed on the first seal, the circuit unit including a power supply circuit configured to supply to a power-supplied unit an electric current occurring in the coil by electromagnetic induction due to relative rotation between the magnet and the coil, an arithmetic circuit configured to calculate a detection value from detection information detected by the sensor, and a wireless circuit configured to produce a wireless signal including a calculation result by the arithmetic circuit; and
an antenna configured to transmit the wireless signal, the antenna being fixed to the first seal.

2. The wireless sensor-equipped bearing according to claim 1, wherein the plurality of magnets are fixed one by one in the through-holes of the retainer.

3. The wireless sensor-equipped bearing according to claim 2, wherein the retainer is a crown retainer configured such that an axial one-end face of the annular body is opened at the pockets.

4. The wireless sensor-equipped bearing according to claim 1, wherein the retainer is a crown retainer configured such that an axial one-end face of the annular body is opened at the pockets.

5. The wireless sensor-equipped bearing according to claim 1, wherein the plurality of magnets are fixed in the through-holes of the retainer in units of an even number of the magnets.

6. The wireless sensor-equipped bearing according to claim 5, wherein the retainer is a crown retainer configured such that an axial one-end face of the annular body is opened at the pockets.

7. The wireless sensor-equipped bearing according to claim 1, further comprising a magnetic shield configured to magnetically shield at least the wireless circuit of the circuit unit from the magnet.

8. The wireless sensor-equipped bearing according to claim 7, wherein the retainer is a crown retainer configured such that an axial one-end face of the annular body is opened at the pockets.

* * * * *